(12) United States Patent
Berger

(10) Patent No.: US 8,910,055 B2
(45) Date of Patent: Dec. 9, 2014

(54) ONLINE SYSTEM AND METHOD FOR AUTOMATED GREETING CARD GENERATION AND MAILING

(75) Inventor: Kelly Berger, Los Altos, CA (US)

(73) Assignee: Shutterfly, Inc., Redwood City, CA (US)

( * ) Notice: Subject to any disclaimer, the term of this patent is extended or adjusted under 35 U.S.C. 154(b) by 439 days.

(21) Appl. No.: 12/882,996

(22) Filed: Sep. 15, 2010

(65) Prior Publication Data

US 2012/0066613 A1 Mar. 15, 2012

(51) Int. Cl.
G06F 3/01 (2006.01)
G06Q 30/00 (2012.01)

(52) U.S. Cl.
CPC ..................... G06Q 30/01 (2013.01)
USPC ....................................... 715/751

(58) Field of Classification Search
USPC ........................................... 715/751
See application file for complete search history.

(56) References Cited

U.S. PATENT DOCUMENTS 5,983,200 A * 11/1999 Slotznick .................. 705/26.43
7,487,223 B2 * 2/2009 Kiyohara ..................... 709/217
2003/0004997 A1 * 1/2003 Parker et al. .................. 707/513
2006/0036681 A1 * 2/2006 Friedman et al. ............. 709/203
2008/0288339 A1 * 11/2008 Streeter et al. ................. 705/14
2009/0077179 A1 * 3/2009 Bi et al. ........................ 709/206
2009/0287585 A1 * 11/2009 Elarde et al. .................... 705/26
2010/0138506 A1 * 6/2010 Van .............................. 709/206
2010/0223155 A1 * 9/2010 Anderson et al. ............... 705/27
2010/0299192 A1 * 11/2010 Aslanian, Jr. ................ 705/14.5
2011/0055132 A1 * 3/2011 Mahdian et al. ............... 706/46
2011/0214046 A1 * 9/2011 Haberman et al. ............ 715/202
2012/0123895 A1 * 5/2012 Horvitz ....................... 705/26.5

* cited by examiner

Primary Examiner — William Bashore
Assistant Examiner — Hien Duong
(74) Attorney, Agent, or Firm — Xin Wen

(57) ABSTRACT

A system and method are described for automatically generating and mailing greeting cards on behalf of the end user. For example, one embodiment of a method for automatically generating and sending a greeting card comprises: collecting from a user of an online card service an identity of recipients and/or recipient groups to receive automated card mailings; collecting triggering event data specifying one or more triggering events upon detection of which, a greeting card is to be automatically generated and mailed to the recipients and/or recipient groups; collecting card template and personalization data specifying card templates to be associated with the various recipients, recipient groups and/or triggering events, and personalized messages to be used for each of the various recipients, recipient groups and/or triggering events, detecting a triggering event indicating that a greeting card is to be automatically generated and mailed on behalf of the end user; automatically generating a greeting card order by combining the card template with the personalized message and sending the resulting card order to a print service, wherein the print service automatically prints and mails the greeting card to the recipients and/or group of recipients on behalf of the end user.

12 Claims, 30 Drawing Sheets

| Name | External SN Site ID | Inner circle? |
|---|---|---|
| Bill Jones | 06084937 | ☒ |
| Cathy Bates | 098773984 | ☐ |
| John Locke | 998009820 | ☐ |

1800 → (table), 1801 → (checkbox column)

*Fig. 18*

ONLINE SYSTEM AND METHOD FOR AUTOMATED GREETING CARD GENERATION AND MAILING

BACKGROUND

1. Field of the Invention

This invention relates generally to the field of network data processing systems. More particularly, the invention relates to an improved architecture and method for automatically generating and mailing greeting cards based on user-specified criteria.

2. Description of the Related Art

Sending paper greeting cards to show someone you care about them or to celebrate life events is a long-standing tradition that has not changed for decades. The user experience for purchasing paper greeting cards has improved significantly over the last few years with the ability to shop online, preview the personalized design before ordering, and have the greeting cards mailed directly to recipients. These online services allow a user to enter a personalized message on a greeting card template via a Web browser. The service then prints the greeting card with the personalized message and either mails the printed cards and envelopes to the end user or directly to the recipients.

Using existing online systems, however, the user still has to initiate and complete each purchase based on the occasion and recipient. There are certain instances when it would be useful to have a service automatically send cards to recipients based on specific criteria established in advance by the user. It would be useful, for example, to enable a user to specify groups of friends and business associates to whom a card should be generated and sent automatically in response to certain triggering events, using a message pre-selected by the end user. Consequently, what is needed is an improved system and method for automatically generating and mailing greeting cards on behalf of an end user in response to certain specified triggering events.

SUMMARY

A system and method are described for automatically generating and mailing greeting cards on behalf of the end user. For example, one embodiment of a method for automatically generating and sending a greeting card comprises: collecting from a user of an online card service an identity of recipients and/or recipient groups to receive automated card mailings; collecting triggering event data specifying one or more triggering events upon detection of which, a greeting card is to be automatically generated and mailed to the recipients and/or recipient groups; collecting card template and personalization data specifying card templates to be associated with the various recipients, recipient groups and/or triggering events, and personalized messages to be used for each of the various recipients, recipient groups and/or triggering events, detecting a triggering event indicating that a greeting card is to be automatically generated and mailed on behalf of the end user; automatically generating a greeting card order by combining the card template with the personalized message and sending the resulting card order to a print service, wherein the print service automatically prints and mails the greeting card to the recipients and/or group of recipients on behalf of the end user.

BRIEF DESCRIPTION OF THE DRAWINGS

A better understanding of the present invention can be obtained from the following detailed description in conjunction with the following drawings, in which:

FIG. 18 illustrates one embodiment of a graphical user interface for importing friends from an external social networking service.

DETAILED DESCRIPTION

Described below is a memories system and method implemented within a stationery and/or card service. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

The assignee of the present application has developed an online stationery and greeting card system as described in the following co-pending patent applications, which are incorporated herein by reference:

SOCIAL NETWORKING SYSTEM AND METHOD FOR AN ONLINE STATIONERY OR GREETING CARD SERVICE, Ser. No. 12/859,094, filed Aug. 18, 2010.

SYSTEM AND METHOD FOR AN ONLINE MEMORIES AND GREETING SERVICE, Ser. No. 12/859,127, filed Aug. 18, 2010.

RELATIONSHIP SYSTEM AND METHOD FOR AN ONLINE STATIONERY OR GREETING CARD SERVICE, Ser. No. 12/779,845, filed May 13, 2010.

RSVP SYSTEM AND METHOD FOR AN ONLINE STATIONERY OR GREETING CARD SERVICE, Ser. No. 12/779,825, filed May 13, 2010.

SYSTEM AND METHOD FOR MANAGING CONTACTS AND CALENDARS WITHIN AN ONLINE CARD SYSTEM, Ser. No. 12/702,932, filed Feb. 9, 2010;

SYSTEM, METHOD AND GRAPHICAL USER INTERFACE FOR MANAGING CONTACTS AND CALENDARS WITHIN AN ONLINE CARD SYSTEM, Ser. No. 12/703,051, filed Feb. 9, 2010;

SYSTEM, METHOD AND GRAPHICAL USER INTERFACE FOR MANAGING CONTACTS AND CALENDARS WITHIN AN ONLINE CARD SYSTEM, Ser. No. 12/703,130, filed Feb. 9, 2010;

SYSTEM AND METHOD FOR PROCESSING PERSONALIZED STATIONERY DESIGNS AND SELECTING FULFILLMENT ORDER SITES, Ser. No. 12/638,851, filed Dec. 15, 2009; and SYSTEM AND METHOD FOR DESIGNING AND GENERATING ONLINE STATIONERY, Ser. No. 12/188,721; filed Aug. 8, 2008; Ser. No. 12/426,810, filed Apr. 20, 2009; and Ser. No. 12/641,078, filed Dec. 17, 2009.

Certain aspects of the systems described in these applications (hereinafter referred to as the "co-pending applications") may be used for implementing an online system and method for automated greeting card generation and mailing. As such, system architectures described in the co-pending applications will first be described, following by a detailed description of the present online system and method.

Embodiments Described in Co-Pending Applications

Figure 1:
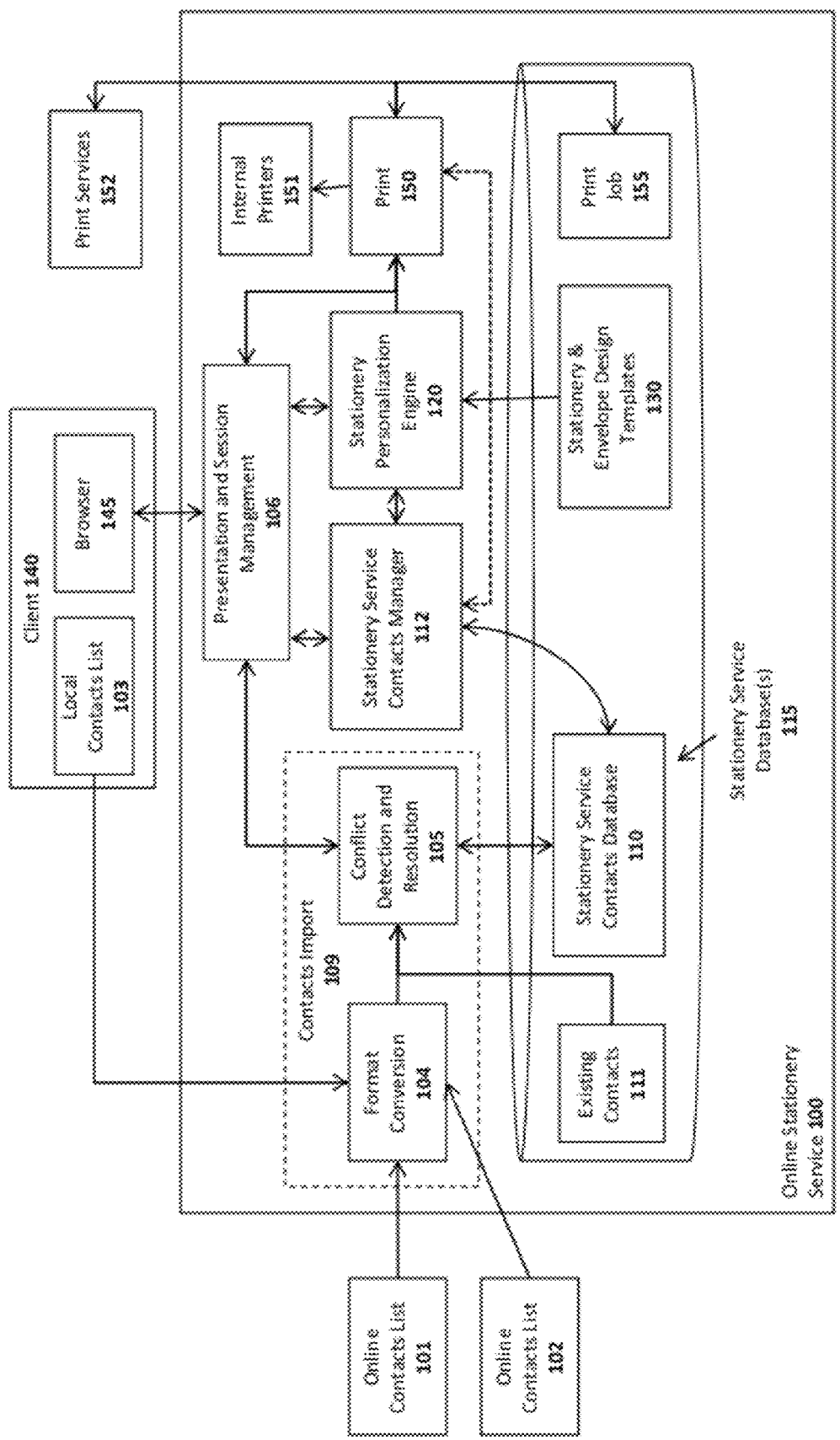
FIG. 1 illustrates a system architecture of a stationery/card service which includes a contacts database.
Figure 2:
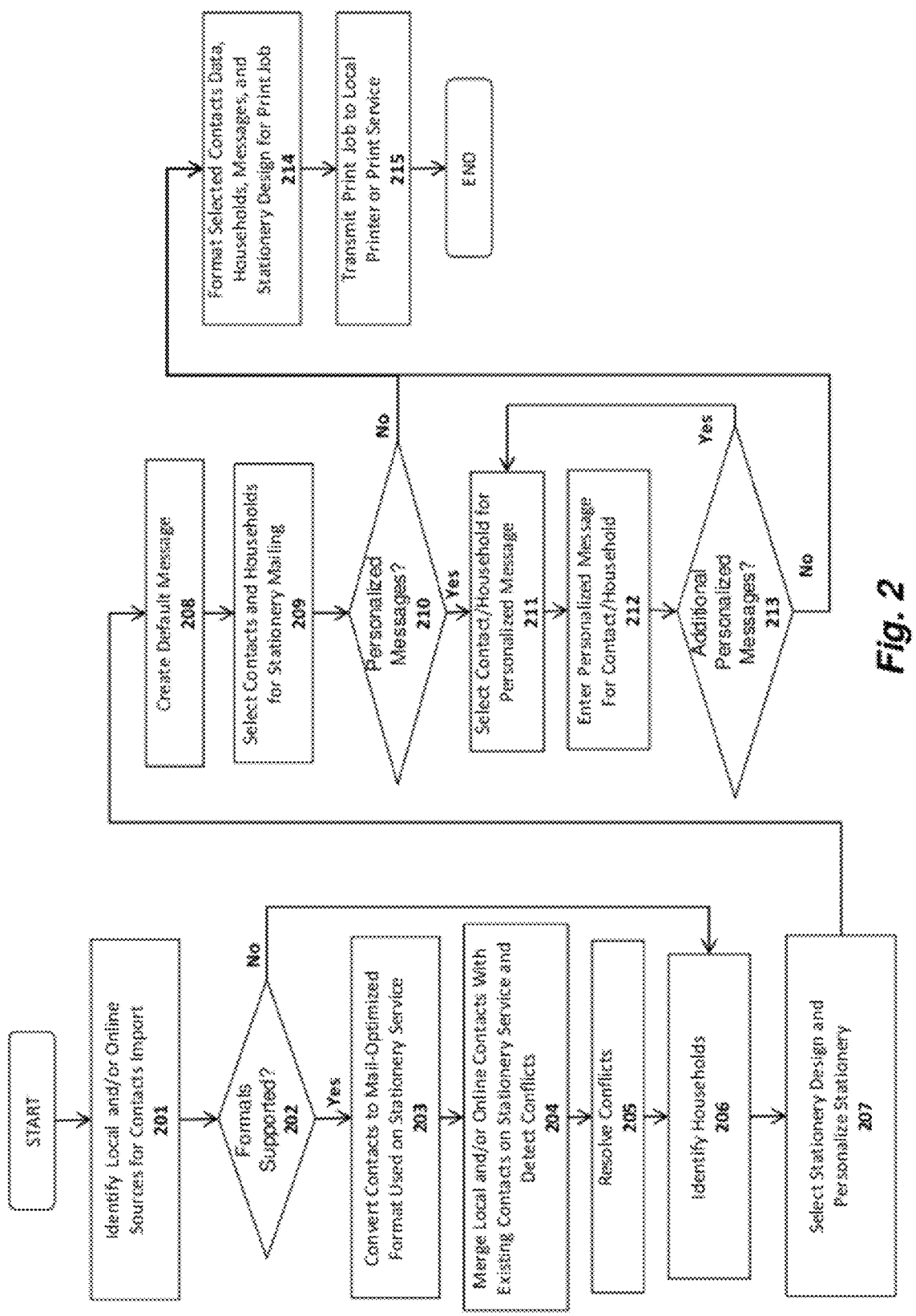
FIG. 2 illustrates a method according to one embodiment of the invention.

FIG. 1 illustrates one embodiment of a system architecture importing and managing contacts within an online stationery service 200 and FIG. 2 illustrates a corresponding method. One embodiment of the online stationery service 100 merges contact data from multiple different sources and then converts the contact data into a format which is optimized for online stationery mailing functions. A brief overview of the method illustrated in FIG. 2 will now be provided within the context of the architecture shown in FIG. 1. It should be noted, however, that the underlying principles of the invention are not limited to the specific architecture shown in FIG. 1.

At 201, a contacts import module 109 manages the importation of contacts from various local and/or online contact databases identified by the end user. In the illustrated embodiment, the contacts import module 109 comprises a format conversion module 104 and a conflict detection and resolution module 105. As shown in FIG. 1, the format conversion module 104 reads contacts data from online contacts databases 101-102; local contacts databases 103 (i.e., "local" to the user's client computer 140); and/or existing contacts 111 already stored on the online stationery service 100 (e.g., the end user may have already established an account on the online stationery service 100 to send stationery and may have entered information for a set of contacts 111). If the online/local contact formats are supported, determined at 202, then at 203, the format conversion module converts the contacts to a format optimized for use on an online stationery service 100. To perform the format conversion, the format conversion module 104 parses the contact data in source data structure (e.g., the CSV file, vCard file, etc), extracts the data, and assigns the data to appropriate data fields in the new data structure. Various well known techniques for converting data from one format to another may be employed by the format conversion module 104. Once converted (and following conflict detection described below), the contacts data is stored in its new format within a contacts database 110 on the stationery service. Various features associated with this new data format are described in detail below.

At 204, a conflict detection and resolution module 105 merges the local and/or online contacts with existing contacts 111 already stored on the online stationery service 100 and detects any conflicts which may result from the merge operation. A conflict may result if one or more contacts being imported are already stored within the existing contacts database 111. In such a case, the conflict detection and resolution module 105 resolves the conflicts at 205 using a set of conflict resolution rules (described below). Once all conflicts have been resolved, the data is persisted within the contacts database 110 and made accessible to end users via the stationery service contacts manager 112. In one embodiment, the contacts database 110 is implemented using mySQL. However, various different database formats may be employed while still complying with the underlying principles of the invention (e.g., Microsoft SQL, IBM SQL, etc).

At 207, the user identifies one or more "households" within the stationery service contacts database 110. As described below, households are specialized groups of contacts who live at the same address. The concept of a "household" is a particularly useful abstraction for an online stationery service 100 which mails stationery on behalf of a user.

As illustrated in FIG. 1, in one embodiment, all operations to the stationery service contacts database 110 occur through the stationery service contacts manager 112. That is, the stationery service contacts database 110 is used for persistent storage of contacts data containing the features described herein and the stationery service contacts manager 112 is the application-layer program code used to perform operations on the stationery service contacts database 110 as described below. The presentation and session management logic 106 comprises the program code for maintaining user sessions and for dynamically generating Web pages containing (among other things) the graphical user interface (GUI) features for manipulating contacts data as illustrated herein.

Returning to the method of FIG. 2, at 207, the user selects and personalizes a stationery design. In one embodiment, this is accomplished with a stationery personalization engine 120 such as that described in co-pending application entitled SYSTEM AND METHOD FOR DESIGNING AND GENERATING ONLINE STATIONERY, Ser. No. 12/188,721, filed Aug. 8, 2008, which is assigned to the assignee of the present application and which is incorporated herein by reference. In one embodiment, the stationery personalization engine 120 performs all of the functions described in the co-pending application as well as the additional functions described herein (e.g., selecting contacts/households for a stationery mailing via the stationery service contacts manager 112, selecting between a default message or a personal message for the contacts/households, etc).

At 208, the end user creates a default message to be used for a stationery mailing and, at 209, the contacts and/or households for the mailing are identified by the end user. If the user wishes to include a personalized message in lieu of the default message for one or more contacts/households, determined at 210, then the user selects a contact/household at 211 and enters the personalized message for the contact/household at 212. If any additional personalized messages are to be included, determined at 213, then steps 211 and 212 are repeated until all personalized messages have been entered.

At 214, all of the information related to the stationery order, including the selected stationery design, default messages, personalized messages and associated contacts and households are formatted for printing by a print module 150 which generates a print job 155. The formatting may include converting the stationery data mentioned above into a format usable by a particular printer. By way of example, a letter press printer may require different formatting than a digital press printer. In one embodiment, the specifications for the print job are encapsulated as metadata in an Extensible Markup Language ("XML") document and transmitted to an external print service 152. In one embodiment, the XML document includes a hyperlink (e.g., a URL) to the formatted print job 155 on the online stationery service 100. The print service 152 then accesses the print job by selecting the hyperlink. Regardless of how the print job is accessed, at 215, the formatted print job 155 is transmitted to either an internal printer 151 or an external print service 152 (e.g., over the Internet). Once printing is complete, the online stationery service 100 or the print service 152 mails the stationery to the contacts and/or households identified by the end user.

Having provided an overview of the method set forth in FIG. 2 and the architecture illustrated in FIG. 1, various specific details associated with managing contacts, generating print jobs and mailing stationery from an online stationery service 100 will now be provided. It should be noted, however, that the underlying principles of the invention are not limited to the particular architecture shown in FIG. 1 or the particular method set forth in FIG. 2.

Figure 3:
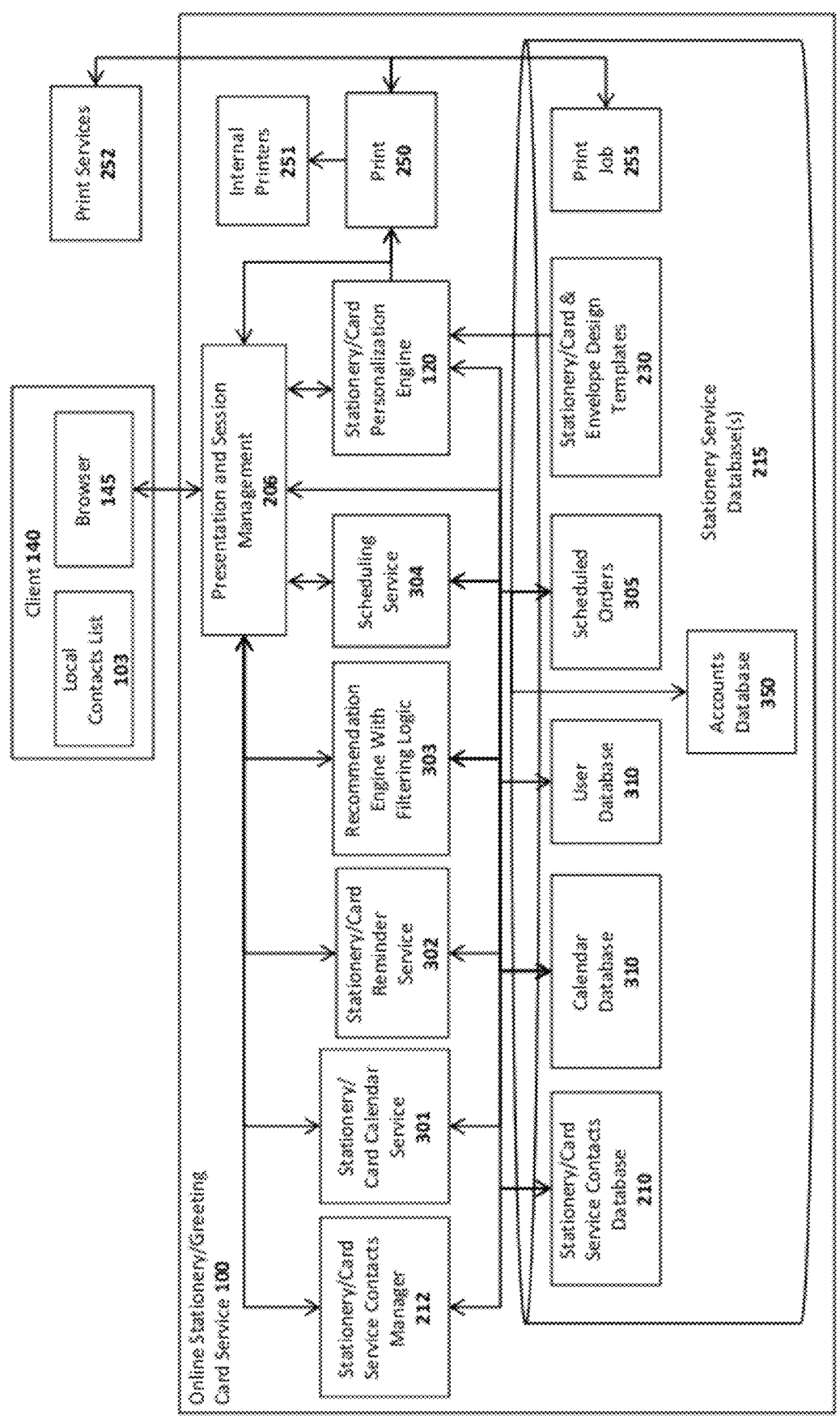
FIG. 3 illustrates a system architecture for an online photo service which includes a contacts database and a calendar database.

FIG. 3 illustrates one embodiment of a system architecture which integrates contacts and calendar data and includes additional modules for generating reminders, filtered recommendations, and for scheduling delivery of greeting cards/stationery. Specifically, in addition to the system components illustrated in FIG. 2, this embodiment includes a calendar service 301, a reminder service 302, a recommendation engine with filtering logic 303 and a scheduling service 304. The stationery/card service illustrated in FIG. 3 also includes a stationery service calendar database 310 for storing calendar data, a scheduled orders database 305 for storing order schedule data, a user database 310 for storing user data (e.g., user stationery/card preferences, configuration options, etc.), and an accounts database 350 for storing user account data. In one embodiment, the various databases shown in FIG. 3 are not actually separate databases but, rather, separate data structures (e.g., tables) within a relational database.

In one embodiment, the calendar database 310 stores calendar data for each user of the online stationery/greeting card service 200 and the calendar service 301 comprises executable program code for managing the calendar data (e.g., reading, adding, deleting, and modifying calendar entries). In one embodiment, the calendar service 301 also acts as an interface to the calendar data to other system modules 212, 302, 303, and 304 (e.g., by exposing a calendar data API).

The reminder service 302 generates graphical or audible reminders of upcoming calendar events and may prioritize the events based on a set of prioritization rules. In one embodiment, the calendar events are prioritized chronologically but some events are given relatively higher priority than other events based on the relationship between the user and the card/stationery recipients (e.g., the user's parents may be given a higher priority than the user's friends, notwithstanding the event dates). For example, an entry corresponding to Mother's Day may be prioritized at the top of the list even though other events (e.g., Labor Day) are nearer in time. In one embodiment, the highest prioritized event is either the next event created by the user (birthday, anniversary, other, etc) OR the next significant Holiday where "significant" holidays are identified in the online stationery/card system and may change over time. In one embodiment, the "significant" holidays are Mother's Day, Father's Day, and Christmas.

The recommendation engine with filtering logic 303 generates stationery/card recommendations to the end user based on the user's preferences and allows the user to filter the results according to user-specified filtering criteria. In one embodiment, the recommendations are categorized based on certain stationery/card characteristics and visually displayed to the end user in different categories (e.g., "new designs," "with pictures," etc). Moreover, in one embodiment, the recommendation engine 303 recommends stationery designs based on the preferences of the user and/or the preferences of the recipient (if known).

In one embodiment, the scheduling service 304 implements a scheduling algorithm to ensure that stationery/card orders are delivered within a specified delivery window and/or on a specific date. For example, the user may specify that a stationery/card order is to arrive 3-4 days prior to a recipient's birthday. In such a case, the user does not want the card to arrive to soon (e.g., 2 weeks prior to the birthday) or too late (after the birthday). To precisely schedule stationery/card orders, one embodiment of the scheduling service 304 evaluates the time required by the print services required to fulfill the order (e.g., thermography, digital press, etc.), the delivery type (e.g., regular mail, FedEx, etc), and the end user preferences.

In one embodiment, three data points are used to determine the delivery date: processing time, fulfillment time, and shipping transit time. The processing time may be based on the type of order. For example, processing time can be 0 days for greeting cards and several days for some stationery cards (e.g., those which require additional review by the online card/stationery service prior to fulfillment). The processing time is based on business days so it must factor in non-business days such as Holidays and Weekends to determine the number of calendar days required for processing. Fulfillment time is the number of days required to print, finish and ship/mail the order and is typically between 1-3 days (e.g., depending on the printing requirements). This time is based on business days for the fulfillment site which, in one embodiment, may be different than business days for the processing site. Shipping transit time is estimated based on the fulfillment site physical location and the shipping address of the recipient. The shipping transit time is based on business days for the shipping carrier and may be different than business days for the processing site and fulfillment site. In one embodiment, after computing the sum of the three data points, the system has the number of calendar days required for the order and determines the date that the order must be sent to the processing site in order to be delivered on the specified delivery date.

Presentation and session management logic 206 generates the Web-based graphical user interface (GUI) features described below, allowing the end user to view and edit the calendar data, contacts data, filtered card recommendations, and scheduling data. As illustrated in FIG. 3, the presentation and session management logic 206 communicates with each of the other functional modules and/or communicates directly with the stationery service databases 215 to retrieve the data needed for display within the GUI. Embodiments of the Web-based GUI features generated by the presentation and session management logic 206 are set forth below.

In one embodiment, each of the functional modules illustrated in FIG. 3 exposes an application programming interface (API) to provide access to data managed by that module. For example, the contacts manager 212 exposes an API allowing the calendar service 301 (and other modules) to access contacts data and vice versa. Alternatively, each of the functional modules may access the database(s) 215 directly.

In one embodiment, the calendar service 301 automatically generates calendar events based on the contacts data stored within the contacts database 210. By way of example, the calendar events may include birthdays, anniversaries, and other significant milestones associated with each of the contacts in the contacts database 210. In addition, the contacts manager 212 stores relationship data identifying the relationship between the user and each of the contacts in the user's contacts database 210 (e.g., identifying the user's spouse, siblings, parents, children, etc.). The calendar service 301 uses the relationship data to generate calendar events. For example, if the relationship data identifies the user's mother and father, then the calendar data may associate Mother's Day and Father's Day, respectively, with those contacts. Similarly, if the user is married with children the calendar service may associate his/her spouse with Mother's Day or Father's Day and/or the user's wedding anniversary.

Once calendar events are scheduled, in one embodiment, the reminder service 302 automatically generates reminders for upcoming events. For example, if a friend's birthday is approaching, then the reminder service 302 will notify the user a specified number of days/weeks ahead of time, so that the user has time to send a card. The specific timing of the reminder notifications may be specified by the end user and stored along with other user preferences within the user database 311.

In one embodiment, the reminders are generated and displayed within a Web-based GUI when the user logs in to the online stationery/card service 200 and/or may be sent to the user in the form of an email message or mobile text message. If sent in an email, links to the online stationery/card service website may be embedded within the message to encourage the user to design a new card.

In one embodiment, the recommendation engine 303 generates greeting card/stationery recommendations based on the occasion, the identity of the contact associated with the occasion, and the end user's preferences. For example, if a particular contact's birthday is approaching, the recommendation engine 303 may recommend certain greeting card styles (e.g., modern, classical, etc.) based on the contact's preferences and/or the user's preferences. The filtering logic allows the recommendations to be filtered based on specified variables (e.g., theme, color, card format, card size, number of photos, etc.).

In summary, among the features offered by the online stationery service 100 is the ability to design stationery for a particular event (e.g., wedding, anniversary party, etc). The stationery design may include the design of RSVP response cards which allow invitees to specify whether they will be attending the event. In one embodiment, the online stationery service 100 prints and mails the stationery with the RSVP response cards on behalf of the end user.

Figure 4:
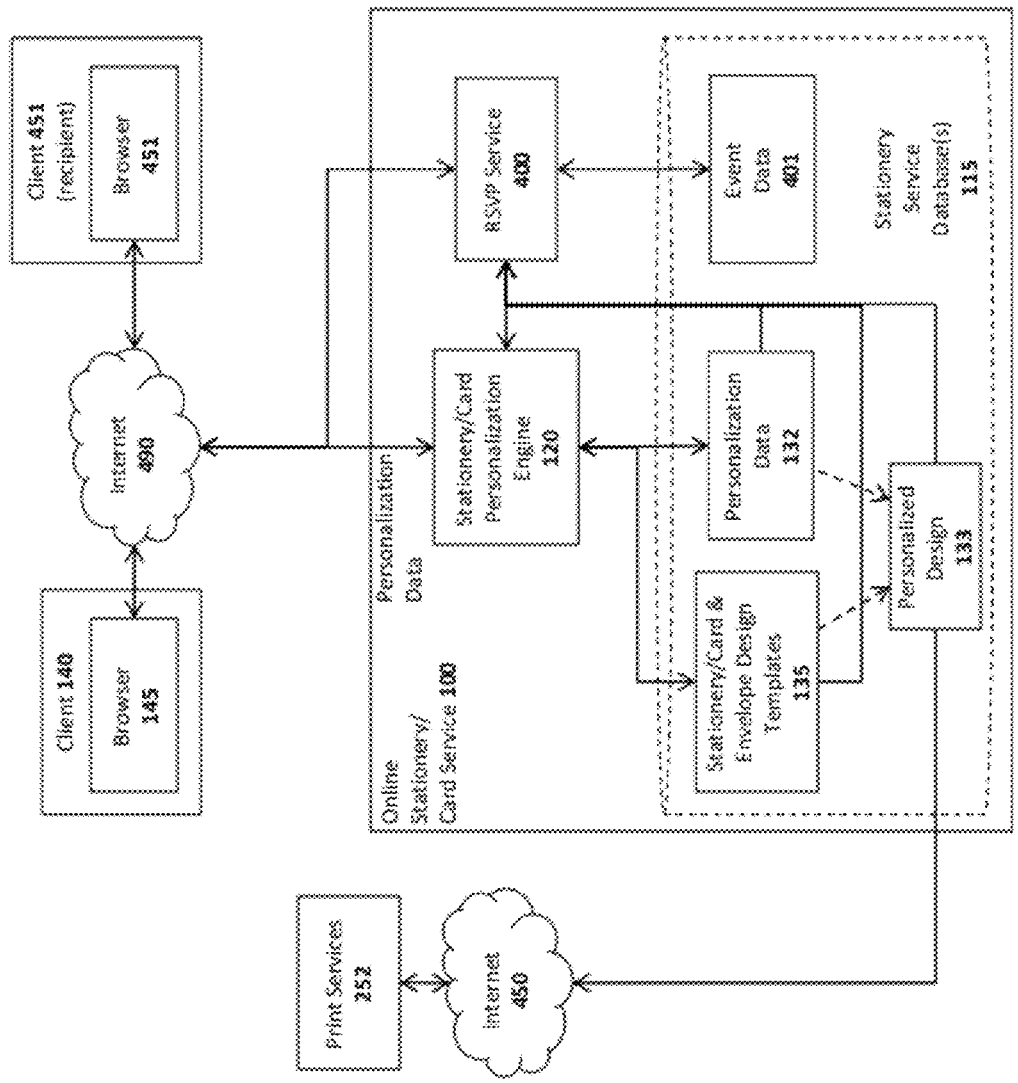
FIG. 4 illustrates a system architecture according to one embodiment of the invention.

Embodiments of an RSVP System and Method for an Online Stationery of Greeting Card Service FIG. 4 illustrates an RSVP service 400 which, in one embodiment, provides the ability of an end user to manage a guest list for an event, manage and organize RSVP responses from invitees, communicate to the invitees before the event (e.g., to let them know of changes), and communicate to the guests after the event (e.g., via thank you cards/email, sharing photos, etc). In addition, one embodiment of the RSVP service 400 provides invitees the ability to respond electronically to RSVP requests (e.g., by entering a specified network address such as a URL in a Web browser), thereby simplifying the RSVP process. In addition, one embodiment of the RSVP service 400 allows invitees to retrieve and upload information and other content related to the event (e.g., pictures, videos) before, during, and after the event.

As illustrated, the RSVP service 400 may be executed within the online stationery/card/photo service 100 (hereinafter simply "stationery service 100") which, in one embodiment, includes all of the features of the stationery service 100 described above (and in the co-pending patent applications). By way of example, the stationery service 100 may include a stationery personalization engine 120 for allowing an end user to select a particular stationery/card design template 135 and add personalization data 123 (e.g., photos, messages, colors, etc), resulting in a personalized stationery/card design 133. In the present application, the stationery/card personalization engine 120 may allow a user to design a stationery or card for a particular event such as a wedding, anniversary party, or birthday party. However, the underlying principles of the invention are not limited to any particular type of event. As described in the co-pending applications, the personalized stationery/card design 133 may be transmitted to a print service 252 for printing (e.g., over the Internet 450) and may be mailed directly from the print service 252 to recipients identified by the end user.

In one embodiment of the invention, a user may choose to utilize the RSVP service 400 described herein as part of the invitation ordering process. If the RSVP service 400 is selected, then invitees such as client 541 may connect to the online stationery service 100 using a Web browser 451 to submit their RSVP responses. The RSVP responses and other data related to the event 401 may be stored within the stationery service databases 115 and made accessible to the user (e.g., via web browser 145 of client 150) and/or to the invitees, as described below.

Figure 5:
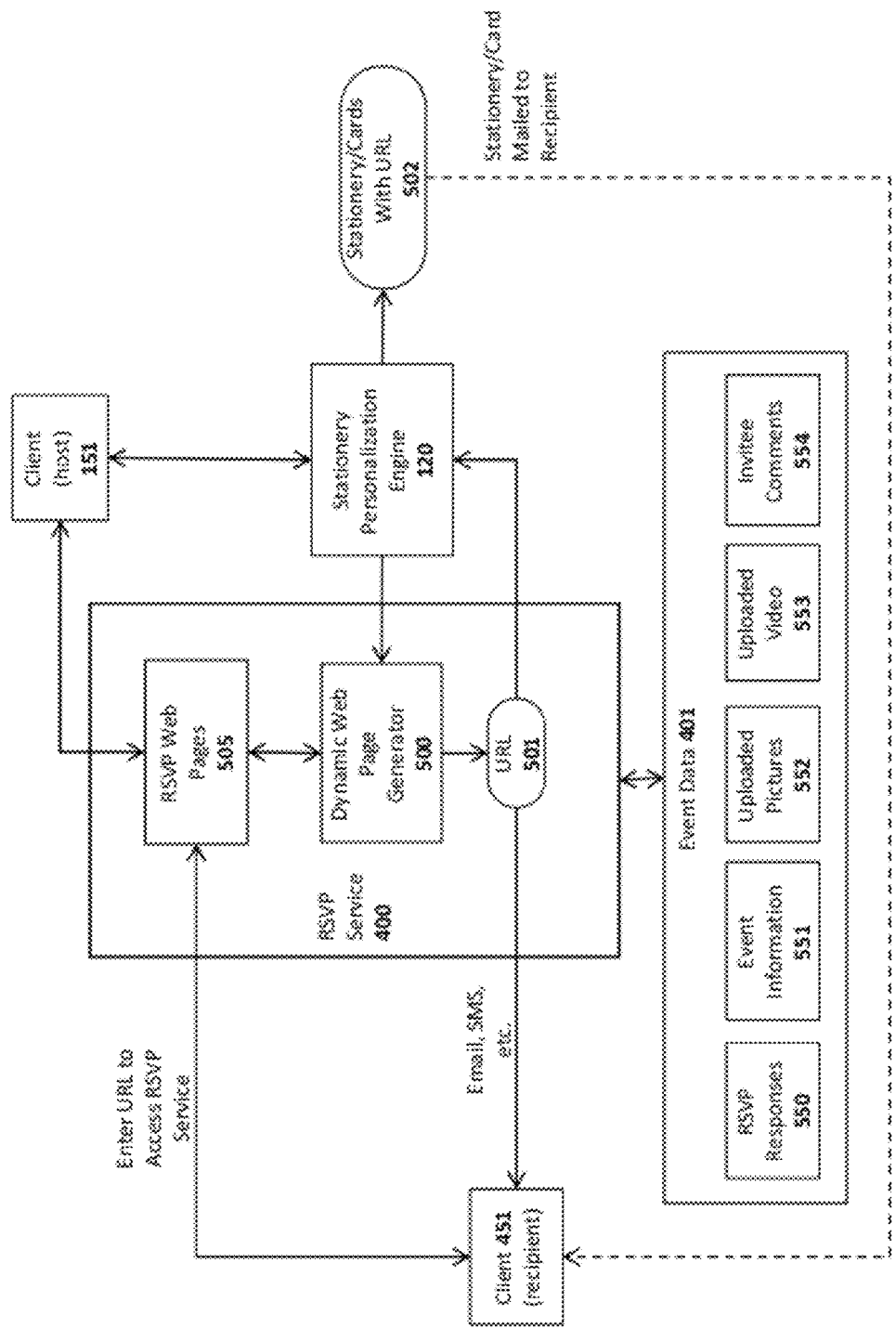
FIG. 5 illustrates an RSVP service according to one embodiment of the invention.

As illustrated in FIG. 5, one embodiment of the RSVP service 400 includes a Web page generation module 400 for dynamically generating a series of RSVP Web pages 505 in response to the user selecting the RSVP option mentioned above. The series of Web pages are sometimes referred to herein as the "RSVP Website 505." In one embodiment, the URL 501 linking to the RSVP Website 505 is dynamically generated and printed on the paper stationery/card invitations 502 mailed to invitees. In addition, the URL 501 may be emailed directly to the invitees 451. In one embodiment, the URL 501 is printed with alphanumeric characters on the back of the stationery/card along with a QR code or other bar code format which may be scanned to link to the RSVP website. For example, a user may take a picture of the QR code with a mobile device 451 and a browser application (or other application) on the user's mobile device may interpret the QR code to link to the RSVP website. In one embodiment, the QR code and/or the URL may be shortened versions of the real URL and, upon selecting the shortened version, the user's web browser may be redirected by the online stationery service 100 to the actual URL of the RSVP Website 505.

Regardless of how the invitees 451 link to the Web pages 505, in one embodiment, once connected, the invitees can access and modify various different types of event data. For example, the invitees may enter an RSVP response 550, review event information 551 (e.g., date, time and location; ticket information, etc), upload pictures 552 and video 553 related to the event (e.g., either during or after the event), and submit comments or other text related to the event 554. The event host 151 may access the same underlying event data 401 and may be provided with the ability to modify the event data as described below.

Figure 6A:
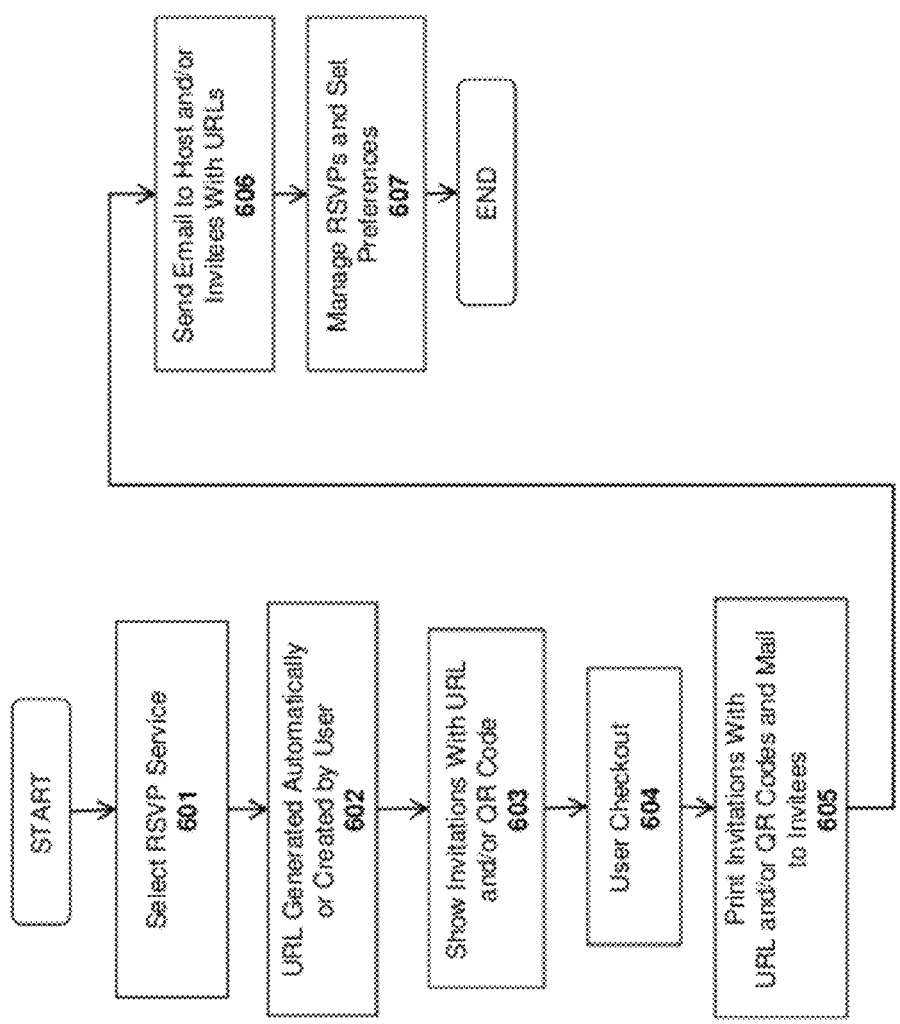
FIGS. 6a-c illustrate methods executed by an RSVP service according to embodiments of the invention.

FIG. 6a illustrates one embodiment of method implemented by the RSVP service 400 from the perspective of the event host. At 601 the host selects the RSVP service option (e.g., at checkout or after personalizing a stationery/card design). At 602, a URL is automatically generated for the RSVP website and/or is manually created by the user. For example, the user may specify a unique URL which includes alphanumeric characters related to the event (e.g., Merediths40thbirthday.com). At 603, the invitation is visually displayed for the host with the URL and/or QR code (or other type of code). In one embodiment, the host may be provided with the option to edit and/or remove URL and/or QR code from the invitation. At 604, the host checks out, placing the invitation order. At 605, the print service prints the invitations with the URLs and/or QR codes and mails the invitations to the invitees. At 606, an email or other electronic message (e.g., an SMS) containing the URL may be sent to the host and/or some of the invitees. At 607, the host may connect to the RSVP website to manage the RSVPs and/or set preferences for the RSVP website (as described below).

Figure 6B:
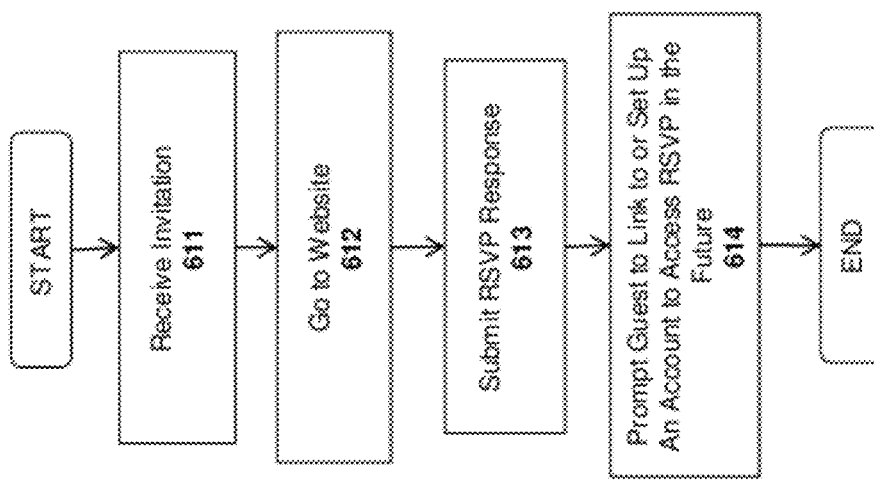

FIG. 6b illustrates one embodiment of a method from the perspective of an invitee who does not have an account on the online stationery service 100. At 611, the invitee receives the invitation and, at 612, the invitee uses the URL and/or QR code to connect to the RSVP website. At 613, the invitee submits his/her RSVP response and, at 614, the invitee is prompted to link to the website or to set up an account in order to access the RSVP website in the future. In one embodiment, the user simply enters an email address and password to establish an account on the online stationery/card service 100.

Figure 6C:
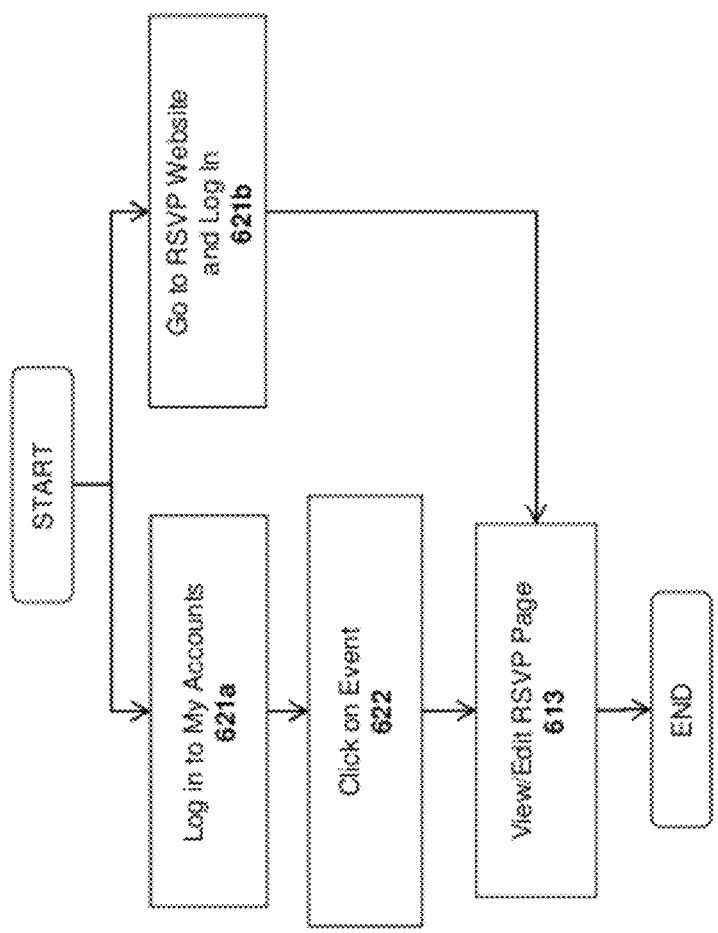

FIG. 6c illustrates one embodiment of a method from the perspective of an invitee who has an account on the online stationery service 100. At 621a, the invitee logs into his/her account on the online stationery service 100 (e.g., by linking to the online stationery service 100 home page). Once the invitee has been invited by the host (e.g., if the host and invitee are linked as friends or if the host knows the invitee's email address, or account information on the online stationery service), then the invitee's home page may contain a link to the event. As such, at 622, the user clicks on the event link and, at 613, views and/or edits the RSVP page (e.g., by submitting an RSVP response). At 621b, rather than linking initially to the invitee's home page, the invitee may go directly to the RSVP website using the URL and/or QR code described above (e.g., from the paper invitation and/or email message sent to the invitee).

Figure 7:
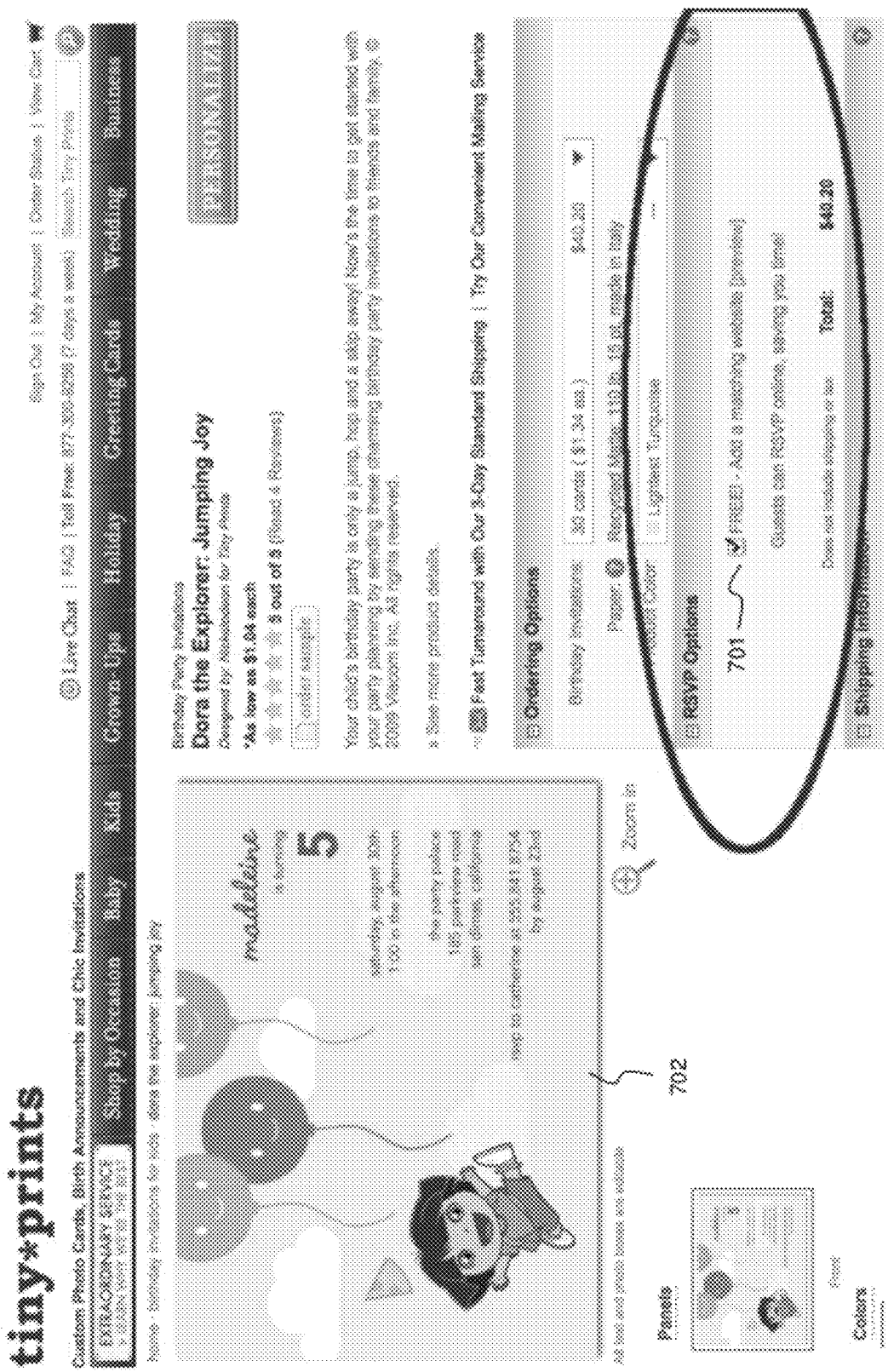
FIG. 7 illustrates a GUI for selecting an RSVP service according to one embodiment of the invention.

Various graphical user interface (GUI) embodiments illustrating Web pages used within the RSVP website will now be described starting with FIG. 7. As shown in FIG. 7, the option to use the RSVP service may be provided as a selectable option 701 from the order page for a particular stationery/card design 702. In this particular example, a check box is used. However, the underlying principles of the invention are not limited to any particular selection graphic. Upon selecting the RSVP service, the various techniques for managing RSVPs and other event-related data may be employed. In one embodiment, the RSVP service 400 is provided as a free add-on service to the stationery/card order.

Figure 8:
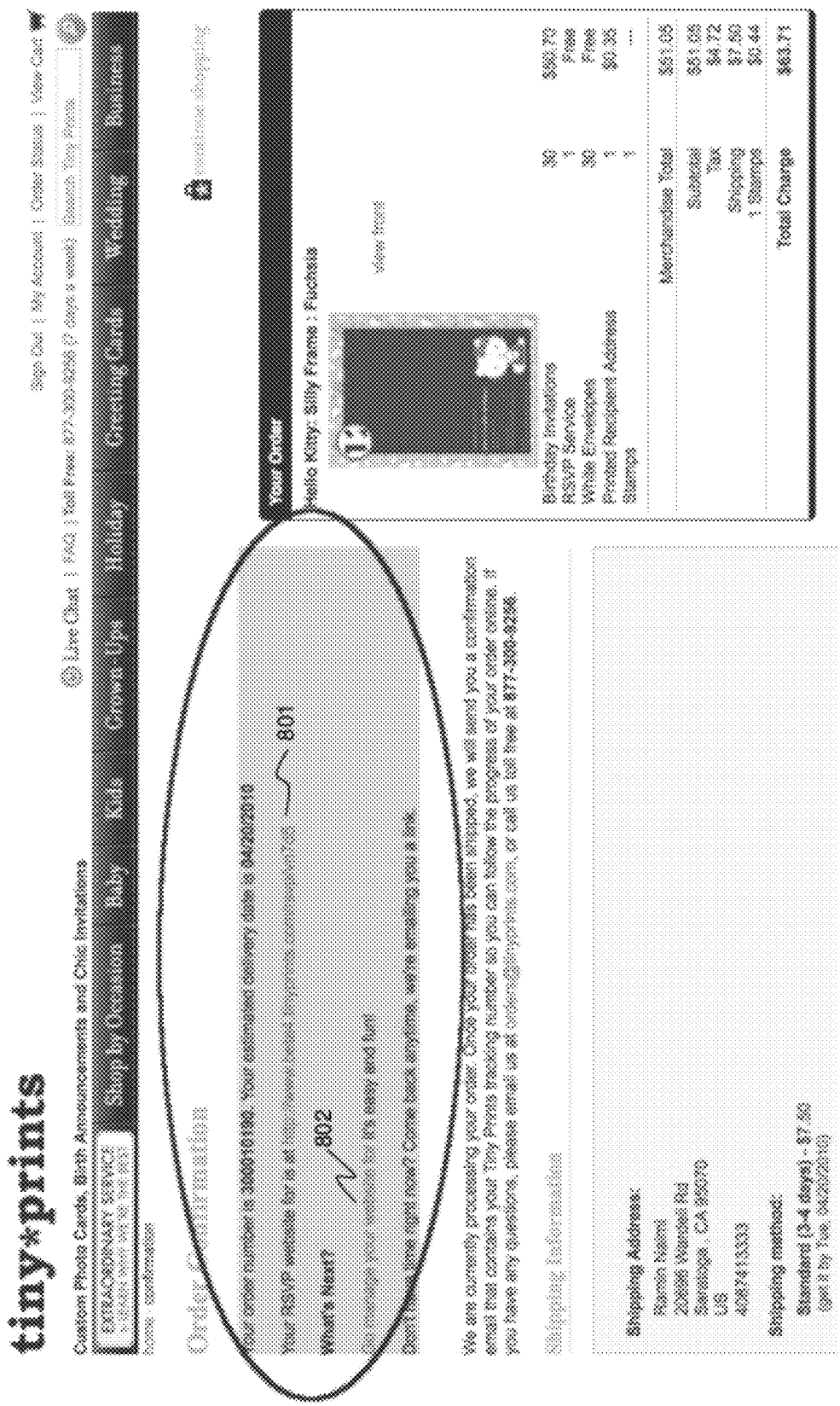
FIG. 8 illustrates RSVP service URLs generated in one embodiment of the invention.
Figure 10:
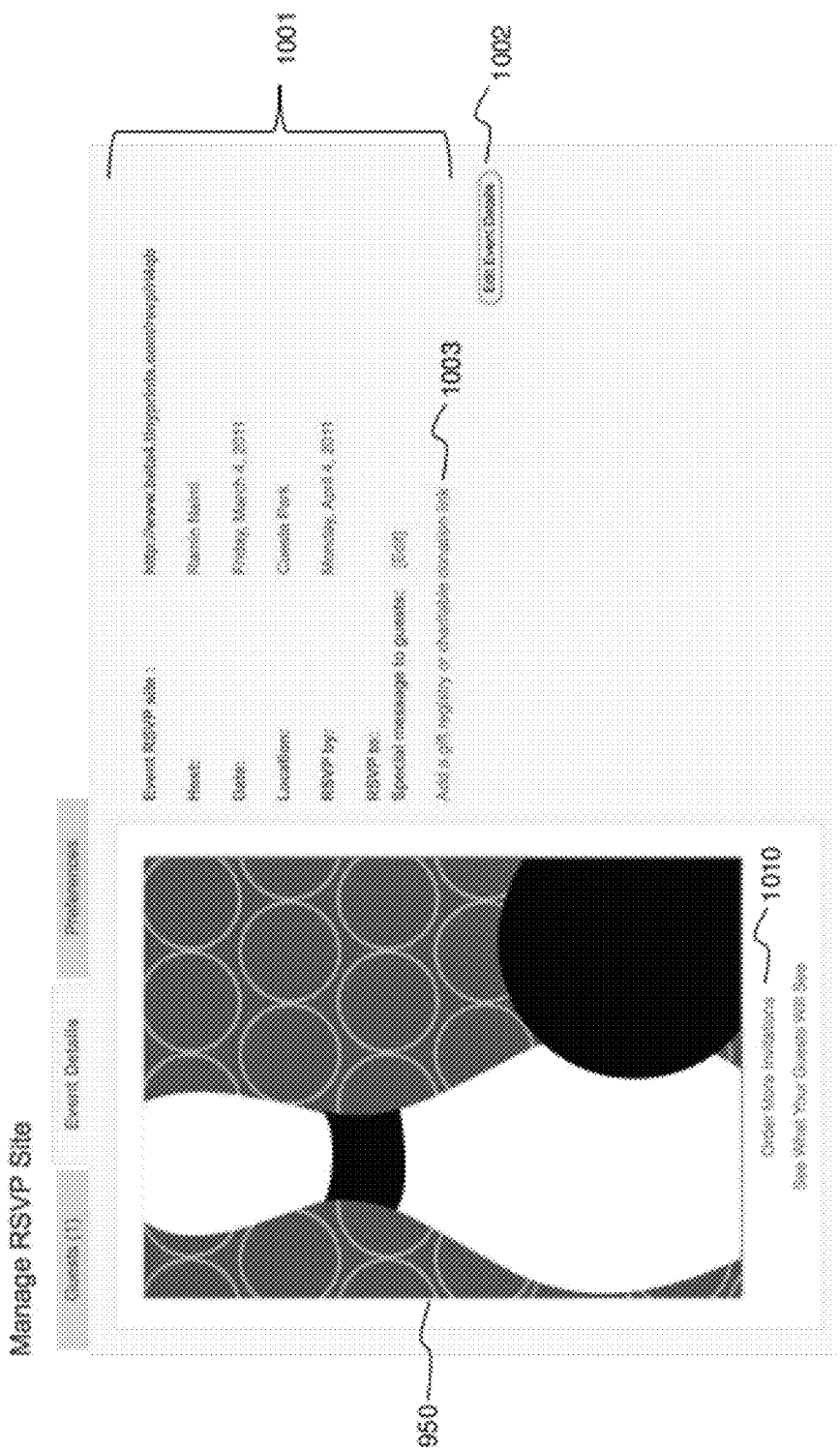
FIG. 10 illustrates an event details screen according to one embodiment of the invention.
Figure 11:
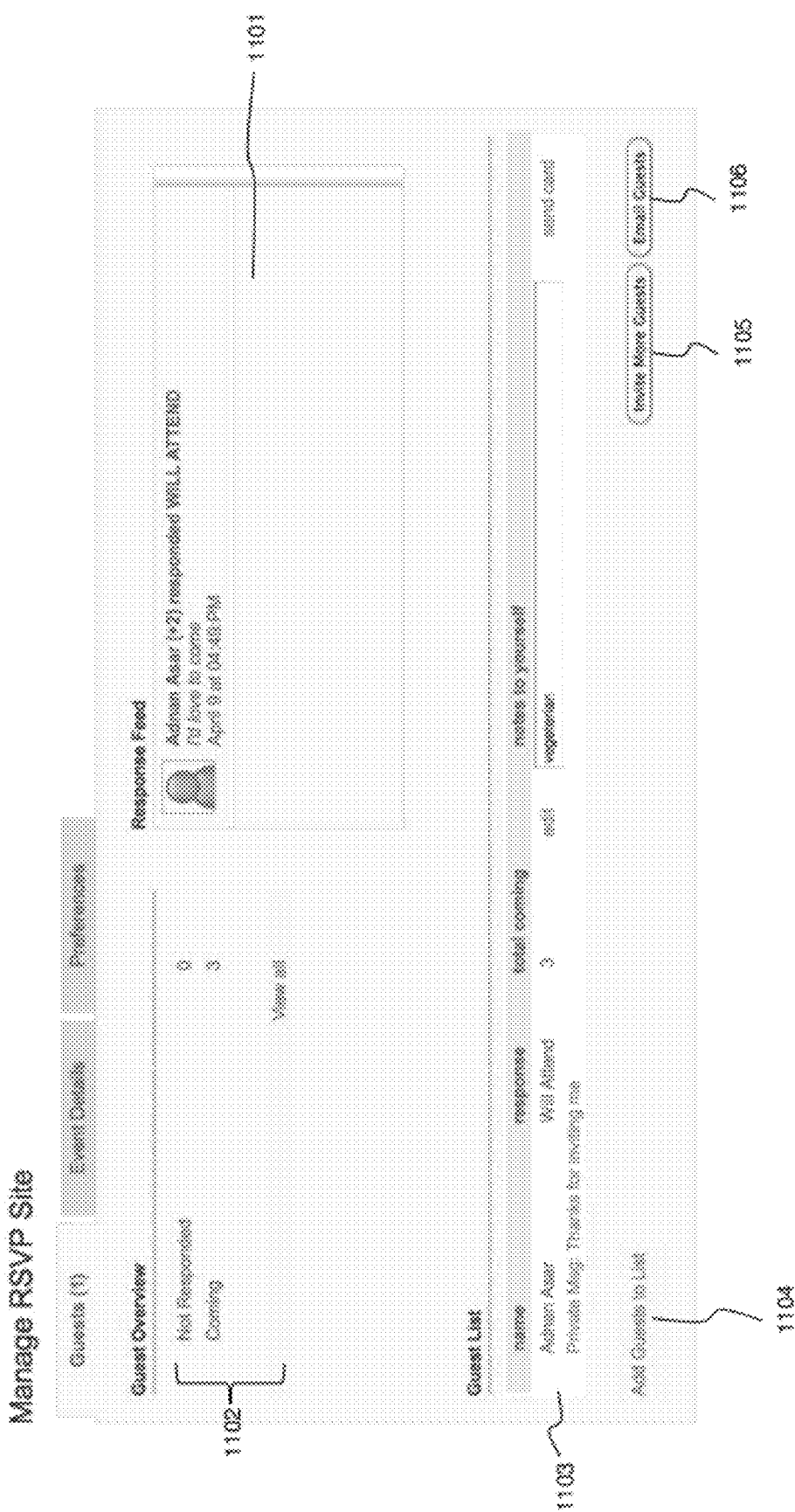
FIG. 11 illustrates a guests screen according to one embodiment of the invention.

As illustrated in FIG. 8, upon selecting the RSVP service and placing a stationery/card order, the host is provided with a link 801 to the RSVP website and a link 802 to the management pages for the RSVP website (both of which are described below). In one embodiment, the first time the host selects the link 802 to the management pages, the host may be asked to confirm that the details associated with the event are accurate. Following confirmation, the user is taken to the Web pages as shown in FIGS. 9-11.

Figure 9:
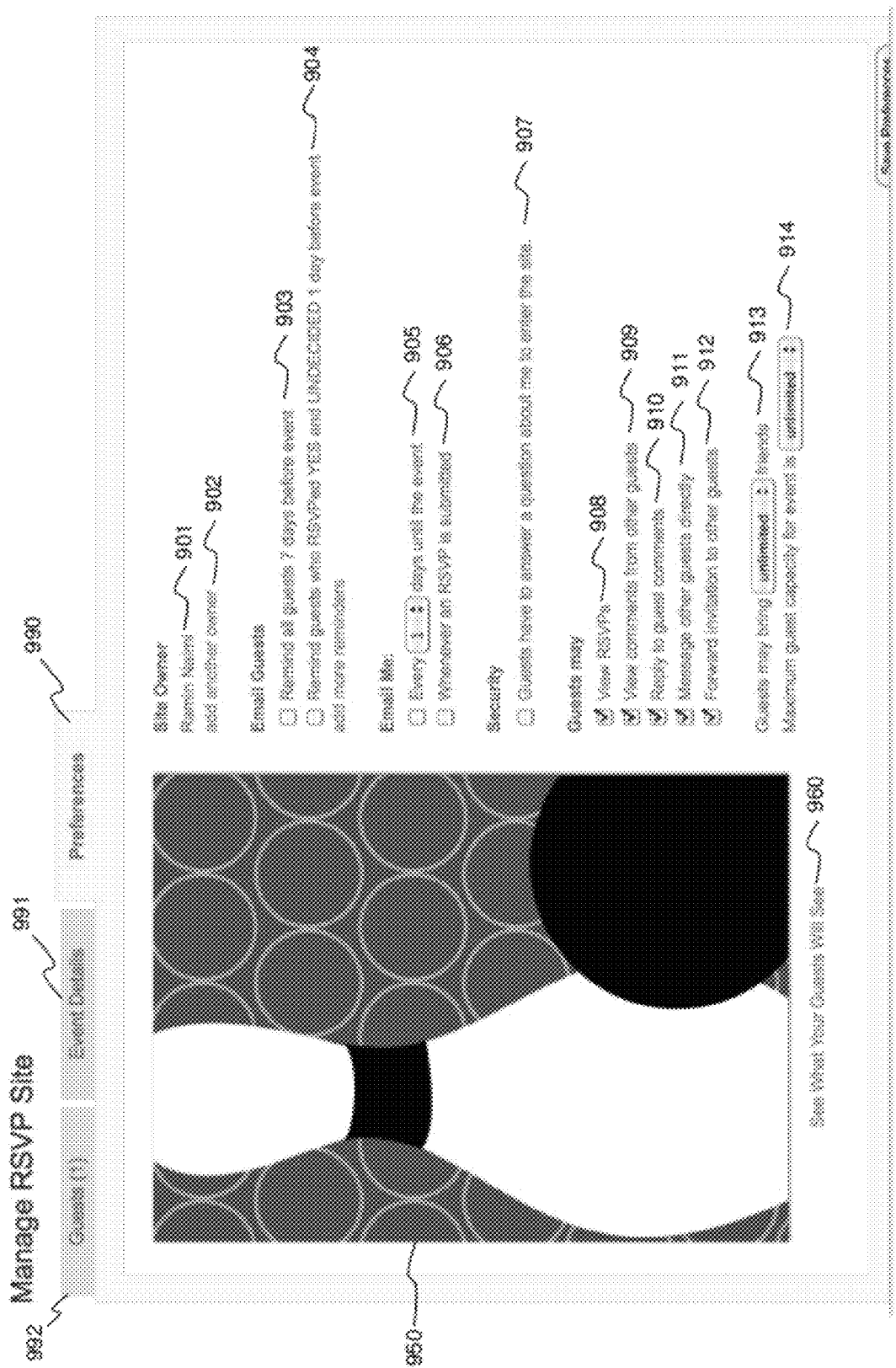
FIG. 9 illustrates RSVP preference settings according to one embodiment of the invention.

As illustrated in FIG. 9, in one embodiment, the management pages for the RSVP website include a set of tabs: a first tab 990 for setting preferences, a second tab 991 for viewing and editing event details and a third tab 992 for viewing guest information. In FIG. 9, the preferences tab has been selected, thereby exposing a set of preferences including the site owner name 901 and a link 902 to add another site owner. In one embodiment, the host is the default site owner and may add one or more additional site owners.

The preferences window also includes an option 903 to remind all guests a specified number of days prior to the event (e.g., 7 days) and an option 904 to remind guests who RSVPed "Yes" and "Undecided" another specified number of days prior to the event (e.g., one day).

At 905, the user may configure the RSVP service 400 to email the host updates every specified number of days until the event. A drop-down menu is provided to allow the host to set the number of days between email messages. In one embodiment, the emails may include a URL to the RSVP website to facilitate connecting to the website. Another selectable option 906 instructs the RSVP service to email the host each time an RSVP response is submitted by an invitee. In one embodiment, the email contains text indicating the RSVP response (e.g., "User X Will Attend").

At 907, the host may indicate that invitees should be required to answer a question about the host prior to entering the RSVP website (for privacy/security reasons). In one embodiment, the question and the answer (or set of answers) may be specified by the host (e.g., what college did the host attend?, how many siblings does the host have?, etc.).

At 908-914, the host may specify settings for the invitees (e.g., by selecting check boxes next to the appropriate selection element). Specifically, at 908, the host may specify that invitees are permitted to view the RSVPs of other invitees. At 909, the host may indicate that invitees are permitted to view comments from other invitees. For example, as described below, each invitee may provide a comment when submitting an RSVP response (and after submitting the response). At 910, the host may specify that the invitees are permitted to reply to comments of other invitees. At 911, the host may indicate that invitees may send messages (e.g., instant messages, email, etc) directly to other guests and, at 912, the host may specify that invitees may forward invitations to other invitees. In one embodiment, the invitations may be sent electronically (e.g., via email) and may contain the URL to the RSVP website.

At 913, a drop-down menu is provided for the host to select the number of friends that the invitees may bring. In one embodiment, the values include "unlimited," "none" and any number of friends. At 914, the host may specify a maximum number of guests which may attend the event. When the maximum has been reached, the RSVP service may notify the host and/or may refuse to accept any new RSVP responses.

In one embodiment, a "see what your guests will see" 960 link is provided to allow the host to view the RSVP website 505 from the perspective of an invitee. In one embodiment, certain types of data such as private messages to the host and notes made by the host are filtered out from the invitee views.

As illustrated in FIG. 10, the event details tab shows the current details for the event as previously entered by the host. In one embodiment, the event details include the URL to the event RSVP website, the host name, the date and location of the event, and the RSVP deadline. The host may also choose an "RSVP to" name (if different from the host) and may enter a message to all guests. A button 1002 is provided to enable the host to edit any of the event details. In addition, a link 1003 is provided to allow the host to specify a gift registry and/or a charitable donation link (e.g., a link to a website managing the registry/charity). An "order more invitations" link is provided as shown to enable the host to order additional invitations and specify additional invitees. The event details page may also include a map showing the location of the event (not shown) with an option to retrieve directions.

As illustrated in FIG. 11, the guests tab shows the current details associated with invitee responses. A guest overview region 1102 provides an overview of the number of responses, the number of outstanding invitations (for which responses have not been received), and the results of the responses (e.g., current number of guests who will attend). A response feed region 1101 provides a listing of those guests who will attend along with the comments provided by those guests (e.g., "I'd love to come"). Depending on the configuration options specified in the preferences tab, the response feed may be viewable by all invitees.

At guest list region 1103 provides a listing of each invitee and includes the invitee's response (e.g., "Will Attend," "Will Not Attend," "Undecided," or "Not Responded"). Each entry may also include a private message for the host which, in one embodiment, is not viewable by other invitees and the total number of guests who will attend. Additionally, a data entry field is provided so that the host can enter notes related to the guest (e.g., guest X is a vegetarian). One particular use of the data entry field is that after the event, the end user may type in gifts purchased by each guest which can serve as a reminder when sending thank you cards.

In one embodiment, a "send card" link is provided for each entry in the guest list. Selecting the "send card" link may trigger the stationery/card personalization engine 120 to create a card for the selected guest. In one embodiment, if the guest is identified on the online stationery/card service 100 (e.g., if the guest has an account), then card designs may be recommended based on the guest's preferences (and/or the hosts preferences) as described in the co-pending applications.

Figure 12:
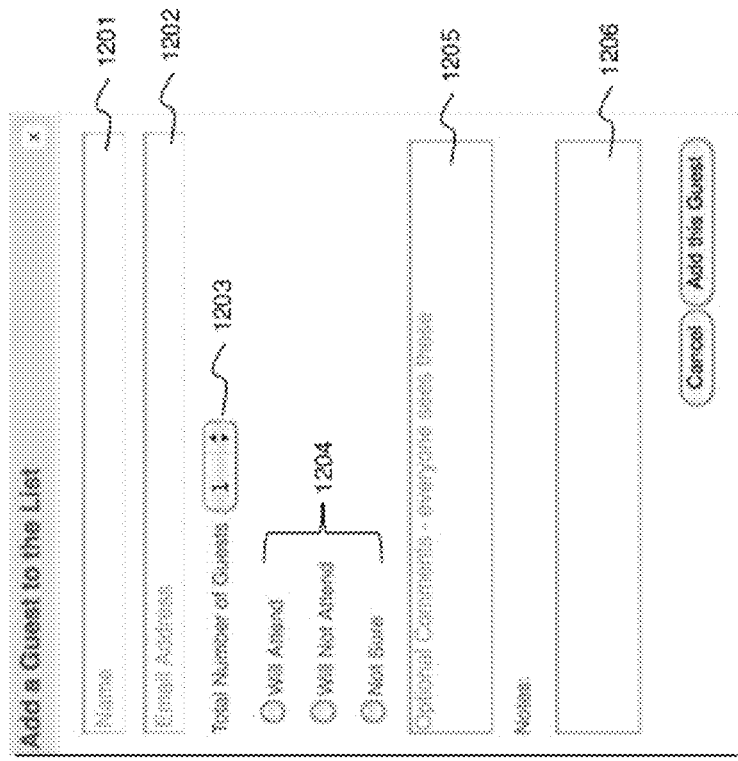
FIG. 12 illustrates one embodiment of a window for adding a guest and/or for submitting an RSVP response.

An "add guests" link 1104 is provided to allow the host to manually add guests to the guest list (e.g., for those guests who respond verbally or via mail). In one embodiment, a window such as that shown in FIG. 12 is generated in response to selection of the "add guests" link 1104. Data entry fields 1201 and 1202 are provided for entering the guest's name and email address and radio buttons 1204 are provided for specifying whether the guest will attend, will not attend or is undecided. The total number of guests associated with the invitee may be specified via a drop-down menu 1203. Public comments may be entered within a first data entry region 1205 (i.e., comments which may be viewed by other invitees) and notes related to the guest (e.g., guest X is a vegetarian) which are only viewable by the host may be entered in a second data entry region 1206.

In one embodiment, the same (or similar) window as that shown in FIG. 12 is generated when invitees select the URL or scan the QR code printed on an invitation. The invitee in this case may specify all relevant information such as his/her name, email address, number of guests and whether or not the invitee will attend. In one embodiment, the name field may be a drop-down menu from which the invitee may select his/her name (i.e., the menu having been previously populated with invitee names from the user's stationery order). In one embodiment, the host may specify a certain maximum number of guests for each invitee. In such a case, up to the maximum number may be selected by the invitee under "total number of guests." In another embodiment, upon selecting more than one under the total number of guests, additional data entry fields may be generated to allow the invitee to enter the names of those additional guests. The invitee may enter public comments within data entry field 1205 and may enter private messages to the host within data entry region 1206. The public comments may subsequently be displayed within the response feed region 1101 shown in FIG. 11 and the private messages may be displayed within the guest list entries 1103 shown in FIG. 11. In one embodiment, upon entering all of the required information, the guest will be taken to the RSVP website where they can view event information 551, responses 550 of other invitees, uploaded pictures 552 and video 553 from the event and invitee comments 554. For example, in one embodiment, invites are provided access to the guest overview information 1102 and the response feed 1101 shown in FIG. 11. Additional regions (not shown) may be provided in the GUI shown in FIG. 11 for uploading and viewing photos and videos. Invitees may also be provided the option to change their RSVP response (e.g., from "will not attend" to "will attend").

In one embodiment, a "sign in" link is provided within the window shown in FIG. 11 to allow the invitee to sign in to the online stationery/card service if he/she has an account or to create a new account of he/she does not have an account. Alternatively, the invitee may choose to bypass the account setup and proceed without an account. In one embodiment, signing in will automatically populate the Name and Email fields with the invitee's information. If the user has not created an account on the stationery/card service 100 an email may be sent to the invitee containing another URL for changing the RSVP response.

Figure 13:
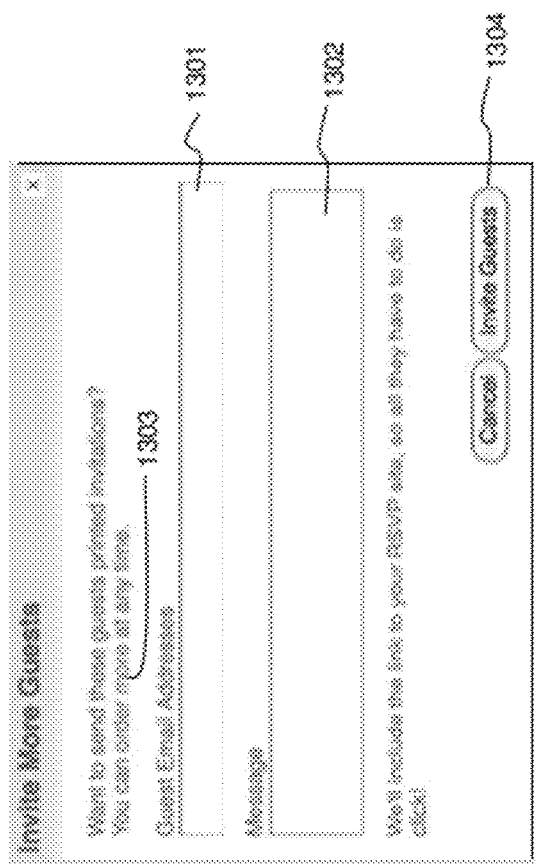
FIG. 13 illustrates one embodiment of a window for inviting additional guests.

FIG. 13 illustrates one embodiment of a window which is generated in response to selection of the "invite more guests" button 1105 shown in FIG. 11. The host may specify the invitee's email address in data entry field 1301 and may enter a message to the invitee in data entry field 1302. Selecting the invite guests button will then cause the RSVP service 400 to send an email to the invitee containing the URL to the RSVP website. In one embodiment, a link 1303 is provided to allow the user to send a paper invitation to the new invitees.

As illustrated in FIGS. 9 and 10, in one embodiment, to generate the RSVP web pages 505, the RSVP service 400 will pull in objects from the stationery/card design templates 135 including the personalization options 132 selected by the host when designing the invitation. In a simple case, such as that shown in FIGS. 9-10, a graphical design 950 from the front of the invitation is reproduced within a specified region of the RSVP website. In some embodiments, the RSVP service 400 may utilize individual graphical objects from the stationery design such as the bowling pin or bowling ball shown in the graphical design 950 and spread the graphical objects around the RSVP web pages.

In one embodiment, the event data 401 includes seating data for the event which the host may view and edit. For example, if the event is a wedding, the seating data may include a graphical representation of the table layout within the venue and an indication of the invitees associated with each table. The invitees may view the seating data and submit seating requests via the personal message field 1206 (for sending a personal message to the host as described above). Alternatively, a separate "seating" field (not shown) may be provided for each of the invitees to submit requests.

Figure 14:
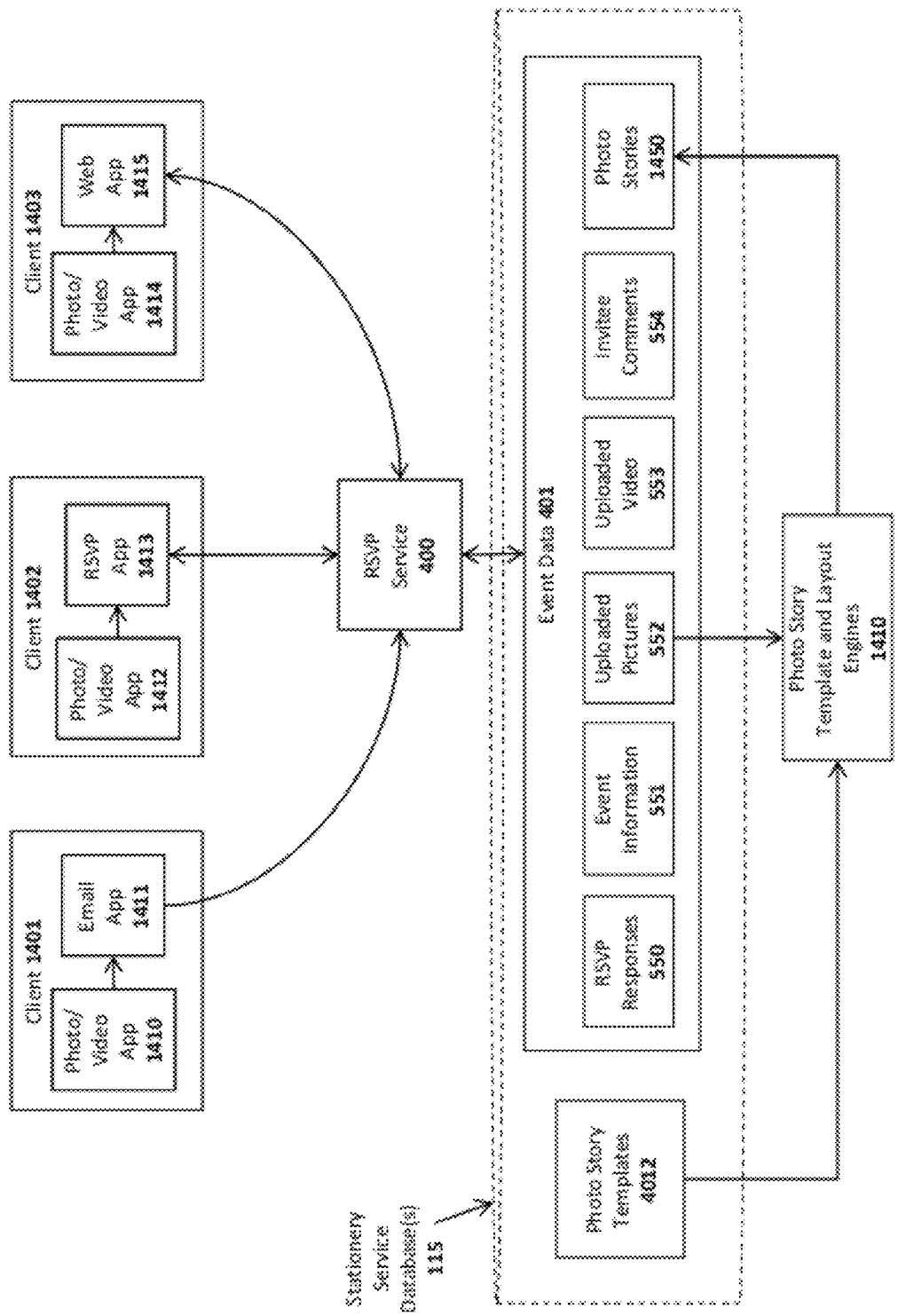
FIG. 14 illustrates different techniques for communicating with an RSVP service and different forms of event data.

As mentioned above, in one embodiment, users may upload photos, videos, comments and other data to the RSVP website before, during, and after the event, thereby turning the RSVP website into a social network site for the event. As illustrated in FIG. 14, the event data 401 may be provided to the RSVP service 400 using a variety of communication channels. For example, each of the clients 1401-1403 shown in FIG. 14 may be mobile devices (e.g., iPhones, RIM blackberries, etc) and may utilize different applications 1411, 1413, 1415 for communicating with the RSVP service 400. For example, in one embodiment, an email address is established by the RSVP service for receiving photos, videos, and comments related to the event. The email address may be provided to invitees as part of the invitation process discussed above (e.g., emailed to invitees or printed on the invitations). Thus, if a mobile client 1401 captures photos at the event (e.g., using camera application 1410) and sends those photos to the designated email address (using email application 1411), the email will be received by the RSVP service 400 which will then extract the photos from the email and automatically post the photos on the RSVP website.

In addition, an RSVP application 1413 designed by the online stationery/card service 100 may be installed on certain mobile clients 1402. The RSVP application 1413 in one embodiment will maintain a continuous or periodic communication connection with the RSVP service 400 and may prompt the user periodically to capture photos and/or video using the photo application 1412. In response, the RSVP application 1413 may upload the captured photos and/or video to the RSVP service 400 which then adds the photos to the event data 401.

Finally, some mobile clients 1403 may utilize a Web application such as a Web browser or browser applet to connection to the RSVP service 400 and upload photos and video captured by photo/video applications 1414.

In one embodiment geo-location techniques may be used to identify the location at which photos are taken and the time/date on which the photos were taken. In one embodiment, any photos taken at the location of the event at the specified date/time of the event will be identified by the online stationery/card service 100 and added to the event data 401. Thus, any users with accounts on the online stationery/photo service 100 may simply upload photos to be included within the event data 401.

In addition, in one embodiment, photo stories 1450 may be automatically created by photo story template and layout engines 1410 executed by the online stationery service 100. Embodiments of the photo story template and layout engines 1410 are described in the co-pending application entitled A GRAPHICAL USER INTERFACE AND METHOD FOR CREATING AND MANAGING PHOTO STORIES, Ser. No. 12/779,764, Filed May 13, 2010, (hereinafter "Photo Story Application") which is assigned to the assignee of the present application and which is incorporated herein by reference. Briefly, based on the content of the photos (e.g., the subjects in the photos, the time the photos were taken, the number of photos, etc), the photo story template and layout engines 1410 will select appropriate photo story templates 4012 and create photo stories 1450 which may then be shared by the host and the invitees. By way of example, a photo story may be created to include photos of a certain invitee at a certain time period during the event in response to a request by the host or by an invitee. Various techniques for filtering photos for photo stories are described in the co-pending application above.

In one embodiment, the techniques for dynamically generating a web page and URL may be applied outside of the RSVP context mentioned above. In particular, in one embodiment, the online stationery service 100 dynamically creates new web pages based on any combination of sender(s), recipient(s), and/or events. In one embodiment, for each new card sent by a sender to a recipient for a particular event, a new URL and QR code will be generated and a new series of web pages can be generated to represent the event. For example, when a sender sends a recipient a greeting card, a web page may automatically be generated for the sender and recipient to share and the card may be printed with the URL and/or QR code allowing the recipient to navigate to the web page. Both the sender and recipient may then upload photos, videos and post comments to the relationship web page.

In one embodiment, the RSVP Website 505 includes a display area with a selection of recommended greeting cards intended for the invitees to send the host or honoree of the event. The recommended cards are chosen by the RSVP service based on the occasion of the event (birthday party, anniversary party, baby shower, etc.), the stationery design chosen for the event, the personal information and design preferences of the host and/or invitee, and/or the greeting cards previously ordered for this event by other invitees. For example, for a birthday party for a four year old where the invitation design has a monkey theme, the recommended cards selection would be birthday cards for a four year old with a monkey or jungle or animal theme. If invitee A purchases a particular greeting card design for the event, invitee B would not be shown the same greeting card design, thereby avoiding duplication of cards from two or more different invitees.

Figure 15:
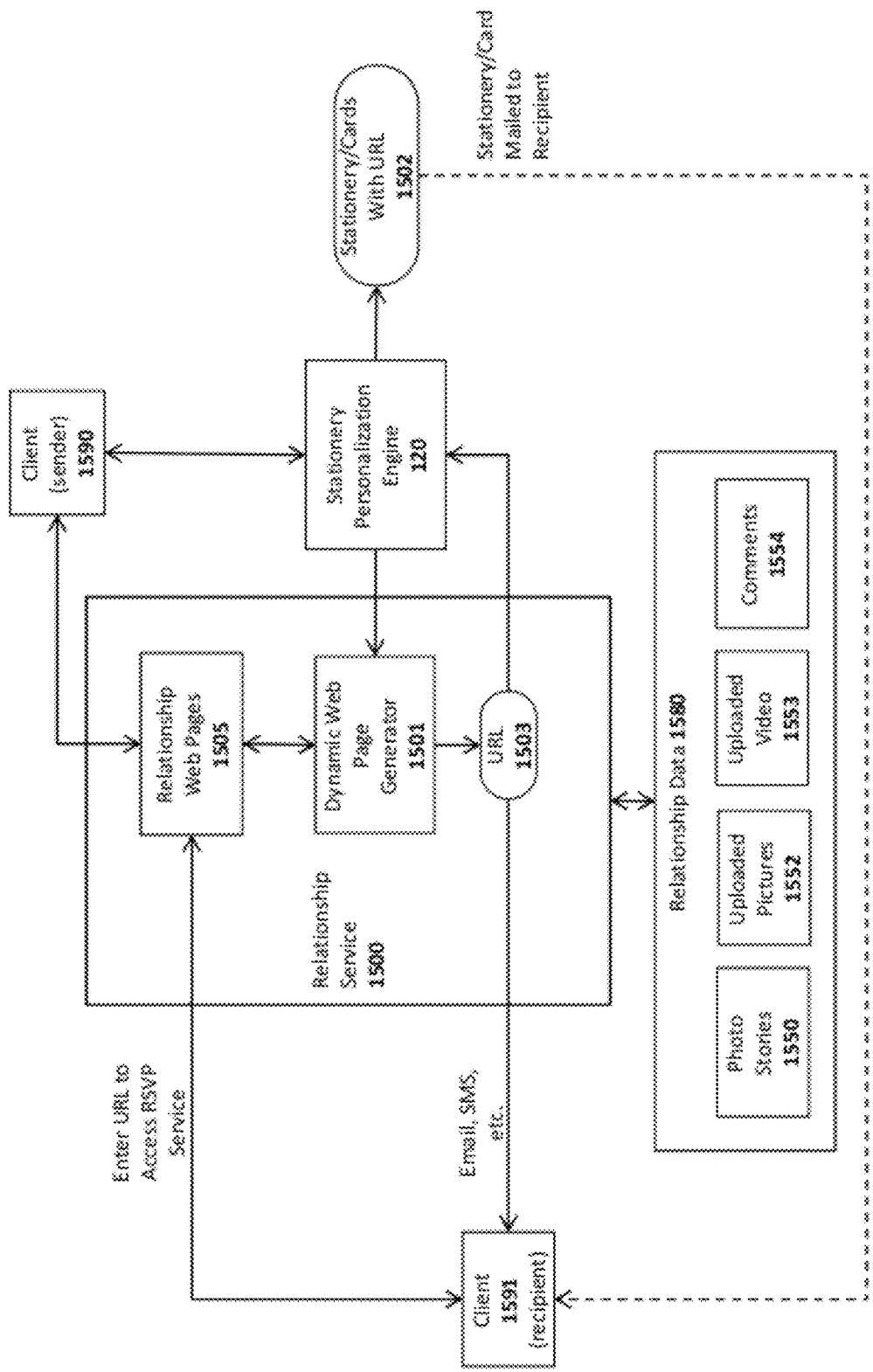
FIG. 15 illustrates a relationship service according to one embodiment of the invention.

FIG. 15 illustrates one embodiment which includes a relationship service 1500 for managing relationships between two or more users. As with the RSVP/event embodiments described above, one embodiment of the relationship service 1500 includes a web page generator 1501 for generating a relationship website 1505 in response to a sender 1590 sending a card to a recipient 1591. In one embodiment, the web page generator dynamically generates a URL 1503 which may be printed on the stationery/card sent to the recipient (e.g., with a QR code as described above). Various types of relationship data 1580 may be shared as described above including photo stories 1550, pictures 1552, video 1553 and comments 1554.

Each new card sent between the sender and recipient may be dynamically added to the website 1505, along with each new picture, video and comment. In one embodiment, the web page generator 1501 automatically creates a graphical timeline with different entries on the timeline selectable by the sender and recipient to view photos, cards, comments, etc, associated with those entries. By way of example, the timeline may include a hierarchy in which the timeline initially includes a series of years. Once a user clicks on a year, a timeline of months for that year will be generated; when a user clicks on a month, a timeline of days within the selected month may be generated; and when a user clicks on a particular day, the content associated with that day may be displayed. These and other techniques for graphically displaying data within a timeline are described in the Photo Story Application which is incorporated herein by reference. In addition, photo stories 1550 may be generated on the relationship website 1591 with the other relationship data 1580. In one embodiment, the photo stories 1550 may include photos of the sender and recipient (or the group of users for whom the relationship website 1505 is generated).

Figure 16A:
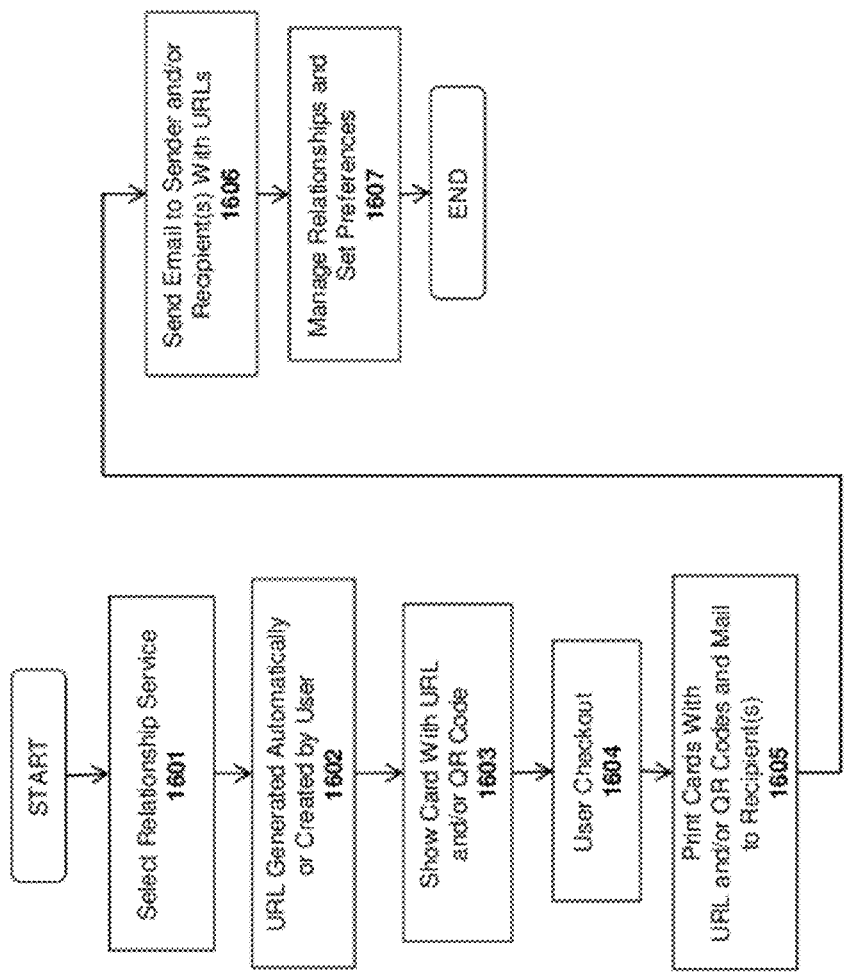
FIGS. 16a-c illustrate methods implemented by one embodiment of a relationship service.
Figure 16B:
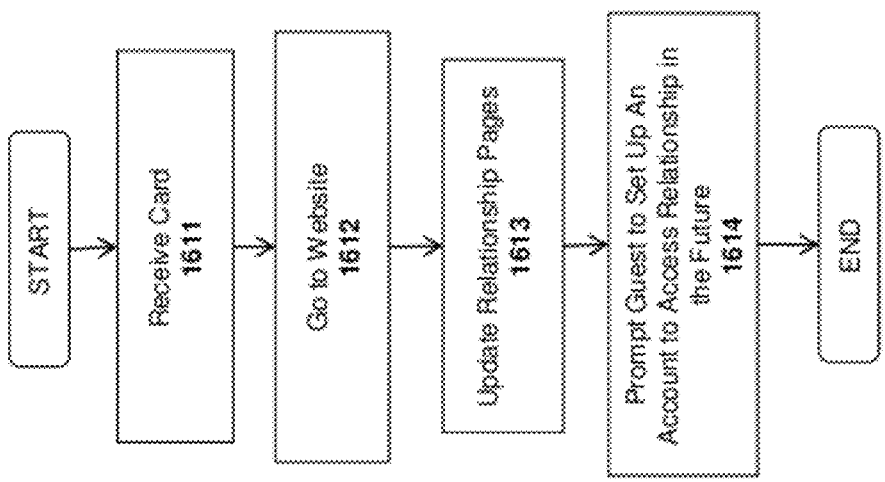
Figure 16C:
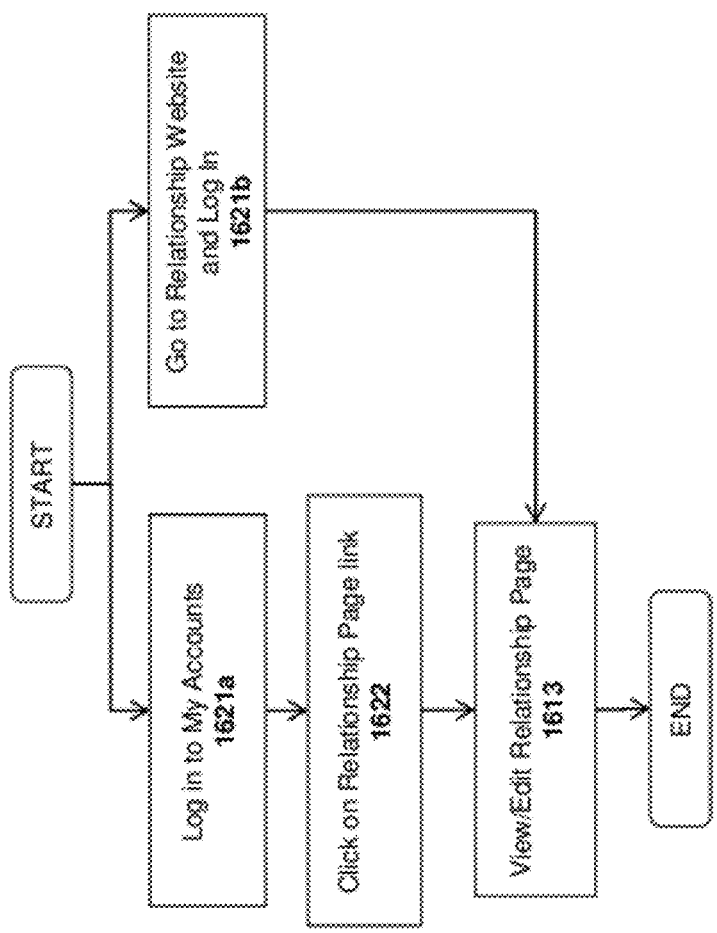

FIGS. 16a-c illustrate methods which may be implemented within the context of the relationship service shown in FIG. 15. At 1601, the sender of a card chooses to use the relationship service (e.g., by selecting a check box as described above). The relationship service may be offered as a free service to those with accounts on the online stationery/card service 100. At 1602, the dynamic web page generator 1501 automatically generates a URL or the URL is specified by the sender. At 1603, the card is displayed for the sender with the URL and/or the QR code graphically representing the URL. At 1604, the sender checks out and, at 1605, the card is printed with the URL and/or QR code and mailed to the recipient(s). At 1606, an email or other electronic message (e.g., an SMS) containing the URL may be sent to the sender and/or some of the recipients. At 1607, the sender may connect to the relationship website to manage the relationship pages and/or set preferences for the relationship website (as described herein).

FIG. 16b illustrates one embodiment of a method from the perspective of a recipient who does not have an account on the online stationery/card service 100. At 1611, the recipient receives the card and, at 1612, the recipient uses the URL and/or QR code to connect to the relationship website. At 1613, the recipient updates the relationship website, for example, by uploading pictures or posting comments. At 1614, the recipient is prompted to set up an account in order to access the relationship website in the future. In one embodiment, the recipient simply enters an email address and password to establish an account on the online stationery/card service 100.

FIG. 16c illustrates one embodiment of a method from the perspective of a recipient who has an account on the online stationery service 100. At 1621a, the recipient logs into his/her account on the online stationery service 100 (e.g., by linking to the online stationery service 100 home page). Once the recipient has been sent a card by the sender (e.g., if the sender and recipient are linked as friends or if the sender knows the recipient's email address, or account information on the online stationery service), then the recipient's home page may contain a link to the relationship page. As such, at 622, the recipient clicks on the relationship page link and, at 613, views and/or edits the relationship page (e.g., by uploading photos or submitting comments). At 621b, rather than linking initially to the recipient's home page, the recipient may go directly to the relationship website using the URL and/or QR code described above (e.g., from the paper stationery/greeting card and/or email message sent to the recipient).

Social Networking System and Method for an Online Stationery or Greeting Card Service location manually entered by the end user). In response, the memories The relationship service 1500 described above allows a user to establish one-to-one or one-to-many online relationships with individuals or groups of individuals, respectively, simply by sending cards to those individuals. For example, in response to sending a card, photo story or message to a friend or group of friends, the relationship service 1500 dynamically generates and/or updates web pages 1505 to maintain an ongoing history of the relationship between the users. This history may include, for example, photos, videos, greeting cards exchanged between the users, messages, and/or any other types of personal information exchanged between the users. Thus, the relationship service 1500 automatically captures and archives a history of moments shared between a user's closest friends and family over time. This close group of friends and family is sometimes referred to herein as the user's "inner circle."

Figure 17:
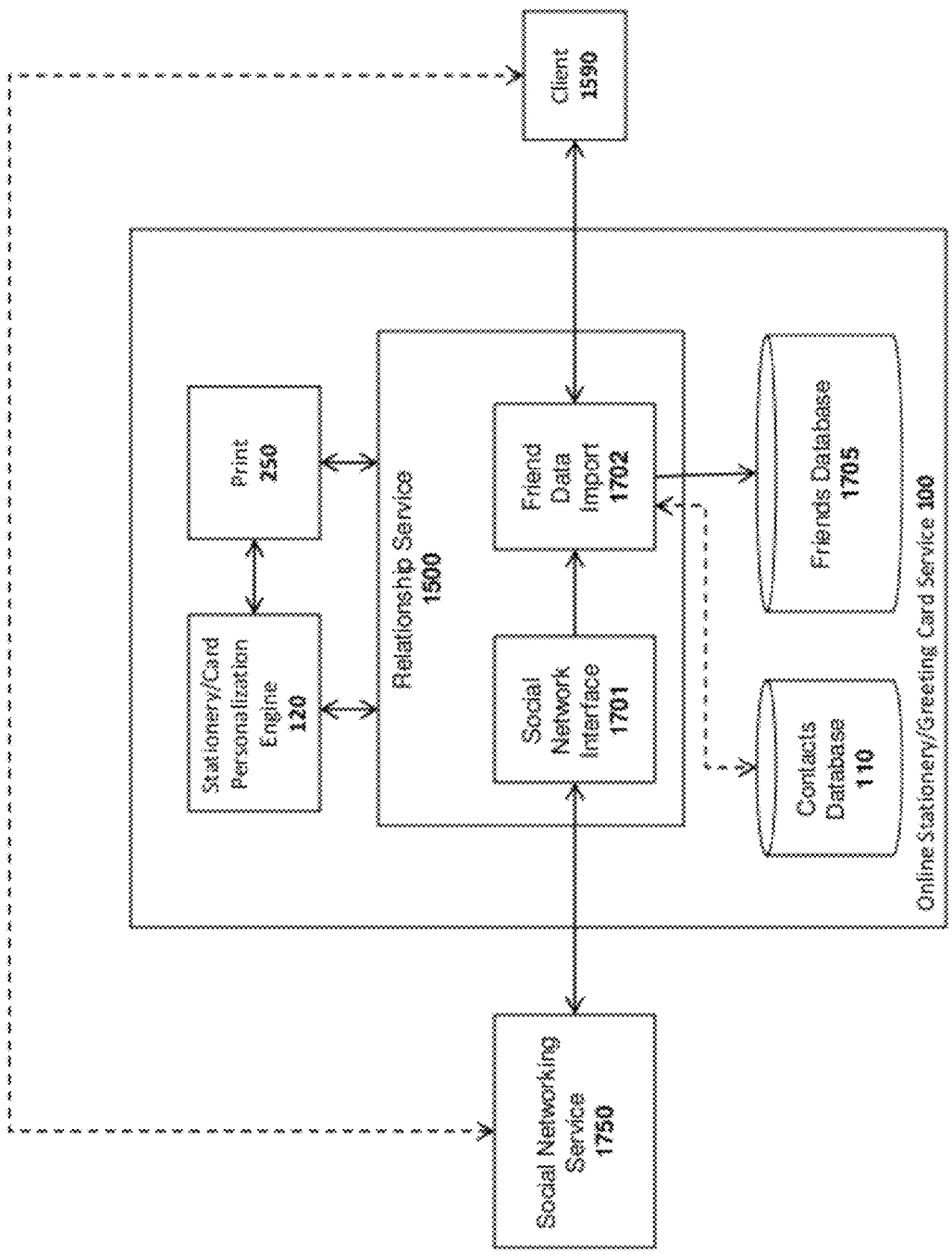
FIG. 17 illustrates a social networking interface and friend data import module implemented in one embodiment of the invention.

As indicated in FIG. 17, in one embodiment, the relationship service 1500 manages and stores associations between the user and each of the user's friends within a friends database 1705. If the user has an account on an external social networking service 1750 such as Facebook, one embodiment of the relationship service 1500 retrieves the user's friends list (and other data) from the external social networking service. As indicated in FIG. 17, the relationship service 1500 includes a social networking interface 1701 for communicating with the external social networking services 1750. Certain social networking services expose an application programming interface (API) to allow interaction with other Web services over the Internet. In the case of Facebook, for example, the API is known as "Facebook Connect" or "Open Graph API" which enables Facebook members to access Facebook social networking data from third-party websites and applications. Consequently, in one embodiment of the invention, the relationship service 1500 utilizes this API to connect to the external social networking service 1750 and authenticates using authentication data provided by the end user (e.g., user name and password). Once authenticated, the social networking interface 1701 retrieves the user's current social networking data including a current list of the user's friends.

In one embodiment, a friend data import module 1702 then supplements and/or filters the social networking data based on input from the user (represented by client 1590). For example, the user may be asked to select whether each friend is to be included in that user's "inner circle" of friends on the online stationery/card service 100. As shown in FIG. 18, in one embodiment, this is done by presenting the user with a graphical user interface 1800 comprising a list of friends imported from the external social networking service 1750 and asking the user to place an X in a selection box 1801 next to each friend to be included in the user's inner circle.

In one embodiment, only those friends who are designated as part of the user's inner circle will be permitted access to certain personal information on the online stationery/card service (e.g., photos, videos, cards sent, etc). For example, in one embodiment, the relationship service 1500 will only generate relationship web pages 1505 for those friends who are designated within the user's inner circle. In this manner, the user can selectively identify those friends with whom the stationery/card service 100 will establish unique, one-to-one (or one-to-many) web pages representing the relationship between the user and the user's friends (or groups of friends), as described herein.

Figure 19:
FIG. 19 illustrates one embodiment of a GUI for sharing content among friends.

In one embodiment, various features of the online stationery/card service 100 are triggered for friends who are part of the user's inner circle. For example, as mentioned above, certain content of the user may only be accessed by friends who are part of the user's inner circle (e.g., certain pictures, photo stories, videos, personal messages, etc). Moreover, as illustrated in FIG. 7e of the Photo Story Application, reproduced herein as FIG. 19, a special "share" button 1959 may be provided to allow the user to share content with a single button click. In this embodiment, selecting the "share" button 1959 will share the content (a photo story 1950 in this example) with everyone in the user's inner circle. The "share" button may also share content with friends outside of the user's inner circle but using a different sharing technique. For example, selecting the "share" button 1959 may share both a paper version and an electronic version of the content within the user's inner circle (e.g., a physical printout of a photo story and a web page displaying the photo story) but may only share an electronic version with friends outside of the user's inner circle. Thus, when the user shares a new card or photo story (or other item), a paper copy of the card/photo story may be automatically printed by the online stationery/card service 100 and mailed to the members of the user's inner circle, whereas friends who are not part of the user's inner circle may receive only an electronic copy (or no copy). In this way, the underlying content is separated from the delivery medium. As indicated in FIG. 19, the user may specify and configure a variety of options 1951-1956 for sharing the user's personal content, including posting the content to external social networking sites 1750 (e.g., Facebook, Twitter) or photo sites (Picasa 1953, Flickr 1954), emailing the content or a link to the content on the online stationery/card service 1955, and printing the content 1956.

In one embodiment, after initially downloading and filtering/supplementing the user's friends list, the social networking interface 1701 periodically communicates with the external social networking service 1750 to check for updates such as new friends and deleted friends. The friend data import module 1702 may then present the user with a GUI to allow the user to specify whether these new friends should be included in the user's inner circle (as described above with respect to FIG. 18).

Figure 20:
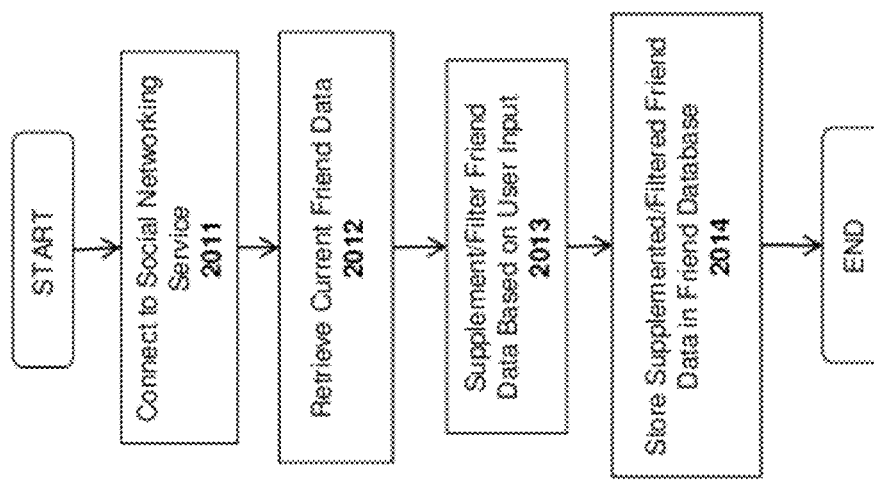
FIG. 20 illustrates one embodiment of a method for importing friend data from an external social networking service.

One embodiment of a method for retrieving and filtering friend data from the external social networking service is illustrated in FIG. 20. At 2011, the social networking interface 1701 of the online stationery/card service 100 connects to the external social networking service 1750 using the authentication data provided by the end user (e.g., user name and password). As mentioned above, the external social networking service 1750 of this embodiment exposes a public API to allow connections from other services. At 2012, the social networking interface 1701 retrieves the current friend data from the external social networking service. If the user has previously retrieved data from the external social networking service, then the networking interface 1701 will only retrieve updates of the friend data (e.g., the identity of new friends and removed friends). At 2013, the friend data import module 1702 asks the user to identify those friends to be included within the user's inner circle on the online stationery/card service 100 (e.g., using a GUI similar to that shown in FIG. 18). If the user has previously downloaded friend data from the external social networking service, then the friend data import module 1702 will only ask about new friends and those friends whose status has changed on the external social networking service (e.g., friends whose status as friends has been removed). Finally, at 2014, the friend data import module 1702 stores the supplemental and/or filtered friend data within the friends database 1705.

In addition to designating "inner circle" friends, one embodiment of the friend data import module 1702 will provide the user with the option of entering supplemental data for each newly imported friend. For example, the user may be asked to enter a relationship for each new friend (e.g., brother, mother, work friend, high school friend, etc), email address or home address. This additional supplemental information may then be used to generate friend groups (as described in greater detail below).

In addition, in one embodiment, the friend data import module 1702 synchronizes the user's friends database with the user's contacts database 110 on the online stationery/card service 100. For example, each friend record in the friends database 1705 may include a link to a corresponding entry in the contacts database 110 and vice versa. The link may simply comprise a pointer or key identifying the corresponding entry in the other database. In another embodiment, the user's friends data is stored directly in the contacts database 110 (and thus synchronization between the two databases is not required). For example, the user's friends data (including the inner circle data) may be stored within one or more tables within the contacts database 110.

In one embodiment, when importing friend data the friend data import module 1702 attempts to identify corresponding contact entries existing within the contacts database 110. If an entry already exists within the contacts database 110, then the friend data import module 1702 may query the user to confirm that the friend is the same as the contact and, if so, establishes a link between the two databases (as described above). Alternatively, if a single database is used, then the database entry (if it exists) is updated with the imported friend data along with the user's inner circle and other friend specifications. At this stage, the friend data import module 1702 will determine if any of the imported friends already have an account on the online stationery/card service 100 and, if so, will link the imported friends to their respective accounts.

In one embodiment, for each friend within the user's inner circle, the relationship service 1500 generates one or more relationship web pages 1505 comprising an ongoing sequential archive of the interactions between the user and the friend. By way of example, and not limitation, the interactions may include electronic/paper cards sent between the user and friend, shared photos and photo stories, messages sent between the user and friend, and shared videos. In one embodiment, the relationship web pages 1505 include a timeline such as described in the Photo Story Application for navigating through the archived content over periods of months or years. See, e.g., Photo Story Application, FIGS. 9a-c and associated text, reproduced herein as FIGS. 21a-c. In this manner, the relationship service 1500 automatically captures and archives intimate moments and memories for the duration of the relationship between the user and each of the user's closest friends, enabling both the user and the user's friends to relive those moments and memories by visiting the relationship web pages 1505 dedicated to those relationships.

Figure 22:
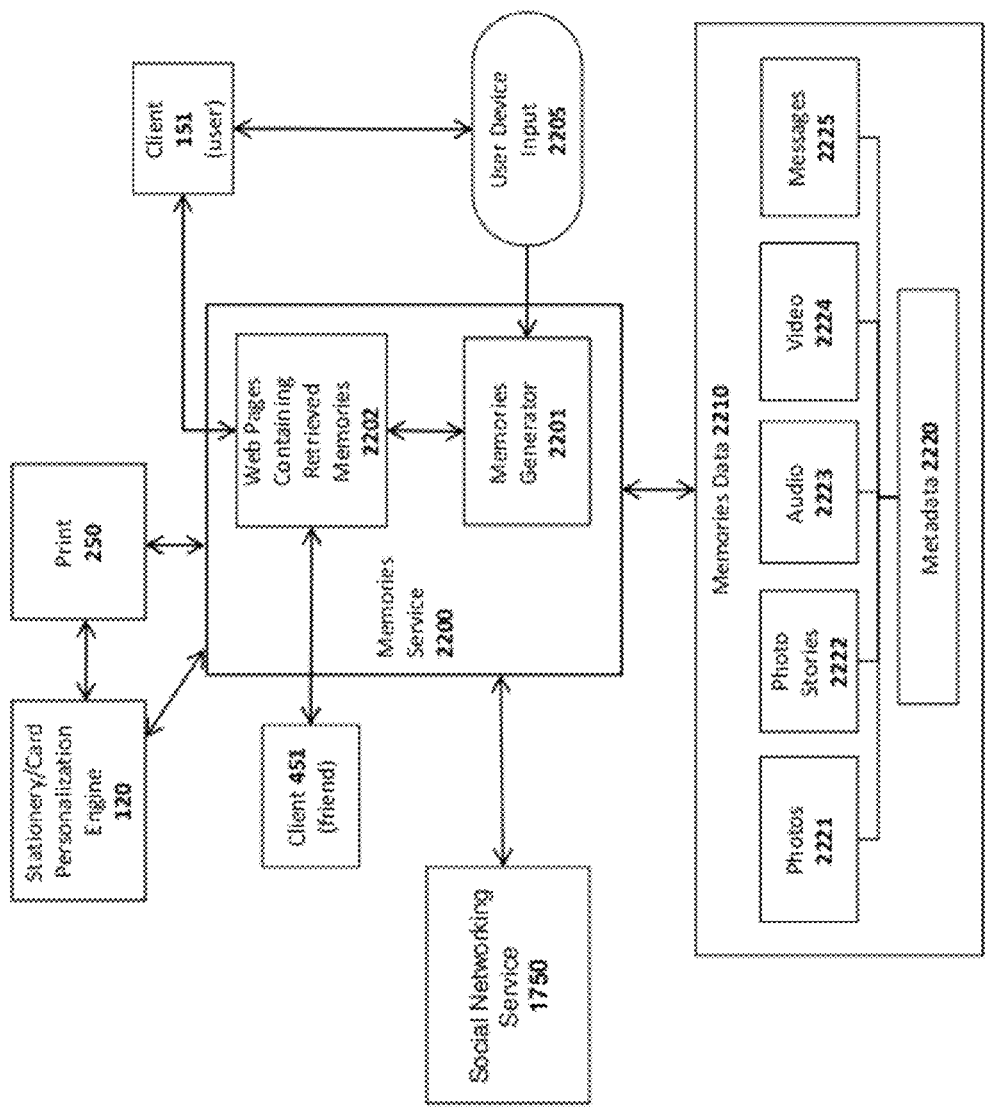
FIG. 22 illustrates an online memories service in accordance with one embodiment of the invention.

In addition, as illustrated in FIG. 22, one embodiment of the invention includes a memories service 2200 for intelligently storing and processing memories 2210 for each user. The memories service 2200 may perform the same (or similar) functions as the relationship service 1500 described herein, the primary difference being that the memories service 2200 is not necessarily limited to "relationships" between two or more users. In fact, the relationship service 1500 may comprise a sub-component of the memories service 2200 (directed specifically to memories associated with specific relationships). The underlying principles of the invention are the same regardless of whether the relationship service and the memories service are the same or different services.

As illustrated in FIG. 22, in one embodiment, the memories 2210 stored by the memories service 2200 may include photos 2221, photo stories 2222, audio 2223, video 2224, messages 2225 (e.g., wall postings, instant messages, etc), and/or any other content related to a user's memories. One embodiment of the memories service 2200 includes a memories generator 2201 for dynamically generating web pages 2202 containing a user's memories based on different criteria. The memories generator 2201 may dynamically generate the web pages 2202 using both metadata 2220 associated with each of the memories and user device input 2205 provided by the user's client device 151. By way of example, if the user is at a particular location such as a restaurant, the user's location data may be provided to the memories generator 2201 (e.g., in the form of a GPS reading or a generator 2201 may generate web pages 2202 containing memories (e.g., photos, photo stores, message, video) from previous times that the user or the user's friends were at this particular restaurant. In this example, the memories generator 2201 may read the metadata 2220 to determine which memories are associated with this particular location. As discussed in the Photo Story Application (referenced herein), the metadata 2220 may either be determined automatically (e.g., by the mobile device used to capture the picture) or manually (e.g., entered by the end user after the picture is taken).

In one embodiment of the memories service 2200, the memories data 2210 is stored on one or more external services and the metadata 2220 is stored in another service. The memories service can therefore associate memories and create stories by retrieving memories data from many different data sources.

The input data 2205 may be generated and transmitted to the memories service 2200 in response to a variety of different triggering events including locations (as discussed above); dates/times (e.g., birthdays); and/or manual user input (e.g., user selection of a particular photo). In response to the detected triggering event, input data 2205 is provided to the memories generator 2201 which then reads the metadata 2220 associated with the memories and responsively generates web pages 2202 or other compilations such as photo stories containing memories associated with the input data 2205.

Various additional details associated with the relationship service 1500 and/or the memories service 2200 are described in detail below.

Figure 21A:
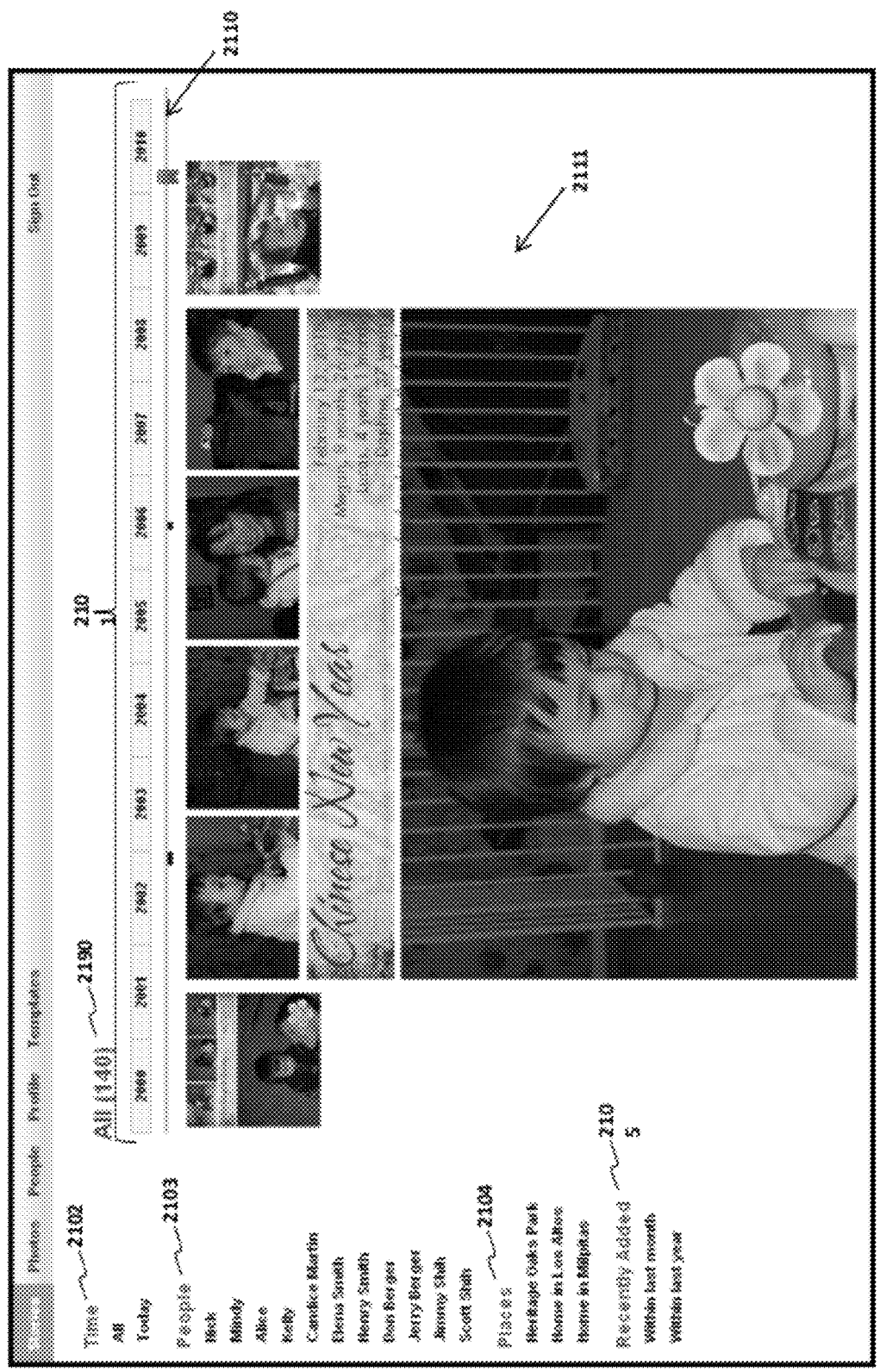
FIGS. 21a-c illustrate one embodiment of a graphical timeline employed for viewing content within relationship web pages.
Figure 21B:
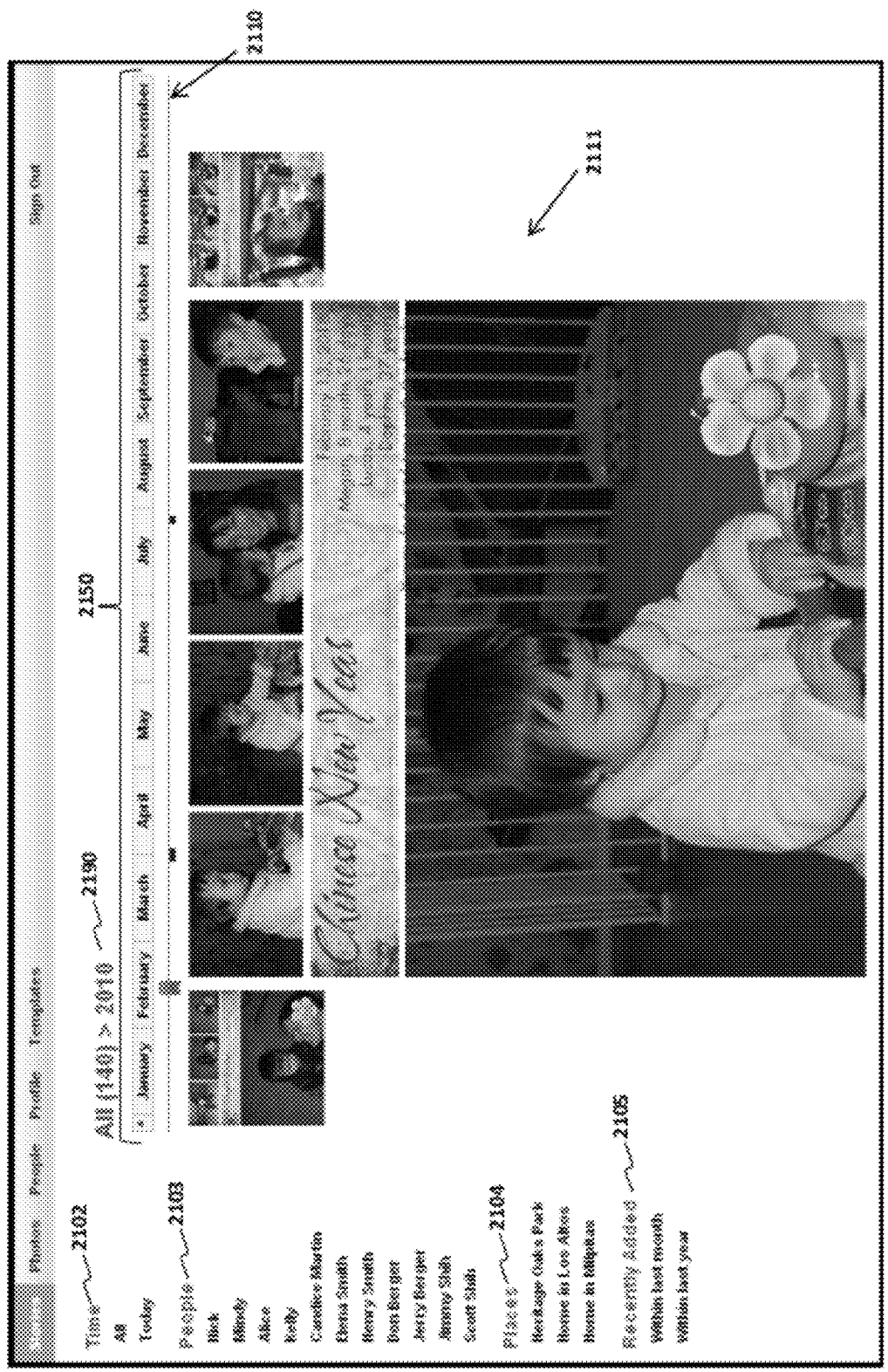
Figure 21C:
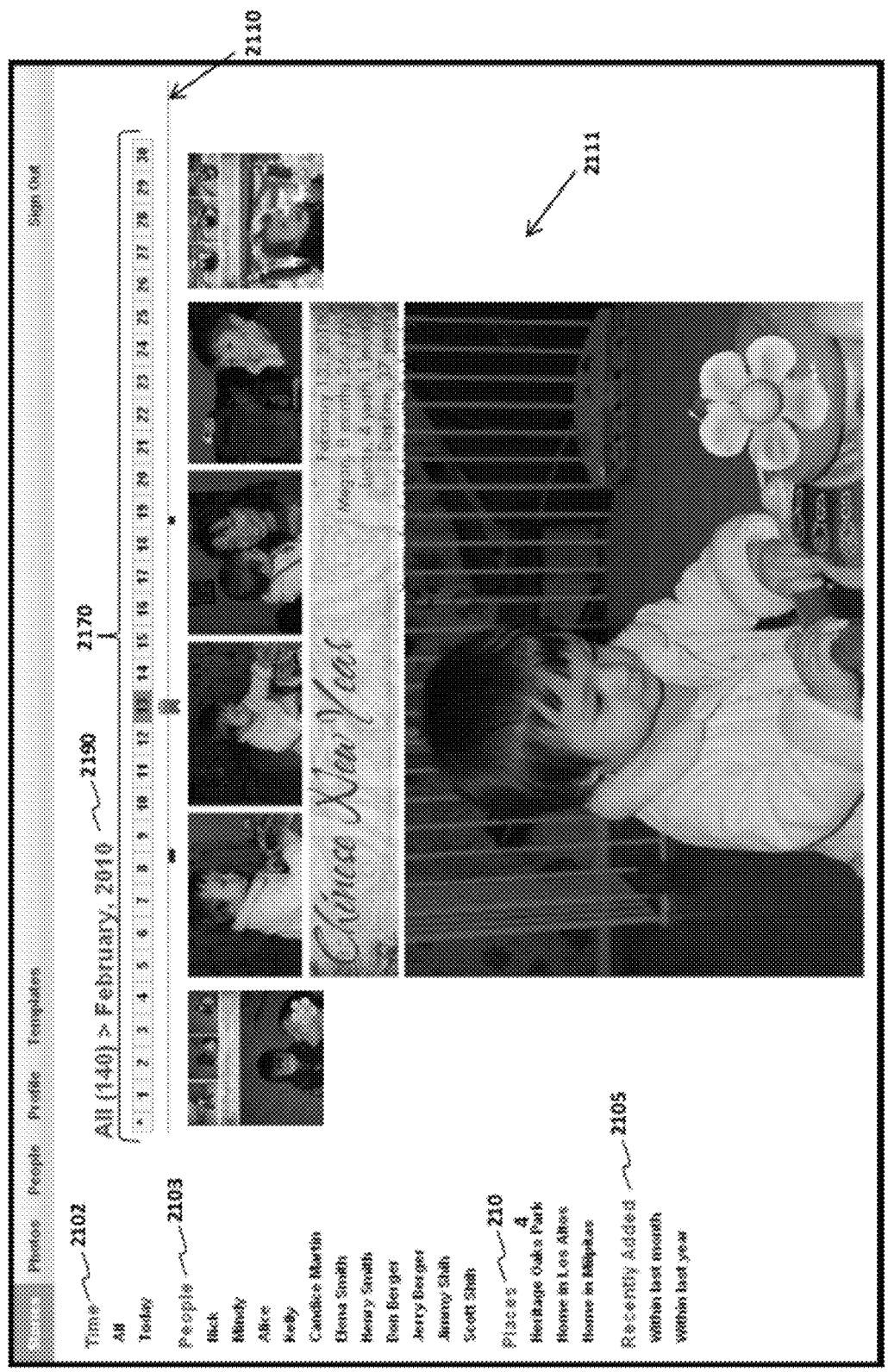

As mentioned above, FIGS. 21*a-c* illustrates one embodiment of a graphical user interface for managing and browsing relationship web pages 1505 and (more generally) memories web pages 2202. While the embodiment shown in FIGS. 21*a-c* is limited to photo stories, the underlying principles of the invention may apply to any type of content contained within the relationship/memories web pages including, for example, videos, personal messages, and standard photos. As illustrated in FIG. 21*a-c*, particular groups of photo stories and other content are displayed within a content region 2111 based on selections made by the user within a set of filtering options 2101-2105. For example, a graphical timeline 2101 is provided at the top of the GUI. Upon selection of a particular date or date range (e.g., month, year) within the timeline, photos and/or other content occurring during that date range are displayed within the content region 2111. A scroll graphic 2110 is also provided allowing the user to scroll through the timeline, thereby causing new sets of photo stories and/or other content to be displayed as the scroll graphic is scrolled.

In one embodiment, the initial browsing window provides a timeline 2101 having a relatively low level of precision. For example, in FIG. 21*a*, the timeline includes a plurality of entries corresponding to a plurality of years (2000-2010). In one embodiment, selecting a particular year from the timeline 2101 filters the photo stories and/or other content displayed within the display region 2111 (i.e., showing only photo stories having photos captured during that year). As shown in FIG. 21*b*, in response to user selection of a particular year, a new timeline 2150 may be generated having a relatively higher level of precision, i.e., months in the illustrated embodiment. Moving the scroll graphic 2110 across the various months in the timeline causes pictures from each month to be displayed. In one embodiment, selecting a particular month from the timeline 2150 displays photos from that month as shown in FIG. 21*c*, and generates a new timeline 2170 having an even higher level of precision, i.e., days of the month in the illustrated embodiment. Selecting one of the days of the month causes photo stories and/or other content from that day to be displayed within the display region 2111. In one embodiment, days, months, and/or years for which no content exists are greyed out within the GUIs shown in FIGS. 21*a-c*. In addition, in one embodiment, links 2190 are provided at the top of the GUI to allow the user to jump to the timelines at different levels of precision.

A separate set of filtering options is provided to the left including options for filtering photo stories and/or other content based on the time 2102, options for showing photo stories involving specific people 2103, specific places 2104 and recently added photo stories and/or other content 2105. As filtering options are selected at the left, an indication of the filtering appears within the heading of the GUI (e.g., "All (128)" is shown in the example in FIG. 21*a*). In one embodiment, filtering options may be combined. For example, the user may select two different individuals under "people." In response, the GUI will only display photo stories and/or other content having both of the selected people as subjects (i.e., the people are ANDed together). In addition, in one embodiment, once a particular person is selected, a list of selectable tags are generated allowing the user to browse through all of the stories that the selected person is in by selecting the different tags (e.g., birthday, hat, cars, park, etc).

In one embodiment, the relationship service 1500 generates and transmits a periodic (e.g., daily, weekly, monthly) email message with moments pulled from the archived content for a relationship to the user and the friends involved in the relationship. Similarly, the memories service 2200 may generate and transmit an email message with moments pulled from the memories data 2210 according to specified event triggers. For example, the relationship service 1500 and/or memories service 2200 may transmit an email on the anniversary of an event (e.g., a wedding anniversary, a birthday, etc) as a reminder of past activities of the user and/or the user's friends.

In one embodiment, each moment/event archived in the form of pictures, videos and messages, are assigned a "life moment number" to indicate how many moments the user has captured. When a friend sends the user a moment, this may also count in the moment number.

In one embodiment, the online stationery/card service 100 will not require users to manage an address book of contacts or manually add friends. Rather, the friend data from the external social networking service 1750 will be used to identify friends. The social networking interface 1701 may also be used to post content back to the social networking service 1750. For example, as described above, when the user creates and shares content such as a photo story, the social networking interface 1701 may utilize the social networking service's public API to automatically post the content on the social networking service 1750.

The following additional relationship service 1500 and/or memories service 2200 features are implemented in one embodiment of the invention:

Selecting Closest Friends:

As mentioned above with respect to FIG. 18, in one embodiment, a user simply clicks a link or button to indicate that a friend from the external social networking service 1750 should be added to their inner circle of friends on the online stationery/card service 100. When new friends are added on the external social networking service 1750, the next time they visit the online stationery/card service 100 the user will see a list of those new friends and select friends to add to their inner circle. In one embodiment, when a friend is removed on the external social networking service 1750, that friend is also removed on the online stationery/card service 100.

Groups:

Most people have multiple circles of friends and family that are associated with certain occasions or activities (e.g., golfing friends, work friends, high school friends, college friends, etc). One embodiment of the relationship service 1500 allows the user to designate groups of friends to communicate with (e.g., send a card, photo story or other content to all members of the group). In one embodiment, the dynamic web page generator 1501 of the relationship service 1500 generates relationship web pages 1505 specifically tailored to the group (e.g., containing pictures, messages, etc, directed to the group). The groups may also be used whenever the user creates a new message and wants to share with one or more groups of friends (but not with all friends). In one embodiment, new groups are created as the user creates and shares cards or stories. For example, if the user creates a birthday party invitation, a new group for birthday parties may automatically be created that can be used for subsequent birthday parties.

Share Mailing Address with Friends:

Since a user selects their closest friends for their "inner circle," the user will be more comfortable sharing contact information including their mailing address. In one embodiment, the relationship service 1500 allows the user to store and manage contact information including mailing addresses that are only accessible for closest friends. A user can send cards or other items to friends by simply choosing their name from a list without even knowing the mailing address. If the recipient does not have the sender in their inner circle friends list or if the recipient's mailing address has not been entered, the relationship service 1500 will send an email or an external social networking service message to the contact requesting the information (along with an explanation as to why the information is being requested).

Create a Memory and Share/Send with One-Click:

A memory may be captured in any media format including (but not limited to) pictures, videos, audio, and written content. In one embodiment, metadata is stored with the media including, for example, time captured, people associated with the media, where the memory occurred and descriptions and tags to indicate the topic of the memory. Various additional examples of metadata stored with pictures are described in the Photo Story Application (referenced above).

As mentioned above, one embodiment of the relationship service 1500 and/or memories service 2200 allows a user to create a greeting card or photo story and easily share it with their inner circle of friends or with all of their friends. The relationship/memories service will create an order for paper cards with the quantity determined by the number of inner circle friends. The user can choose to have the cards mailed directly to the friends, have the cards shipped to them with printed envelopes with the mailing addresses of each friend, or shipped to them with blank envelopes and a printed list of mailing addresses for each of the inner circle friends. The service will send updates to the customer showing delivery status for each recipient and the customer is only charged for cards that can be delivered. When the user creates a photo story, that user can choose to send printed copies to all friends or a group of friends. One embodiment of the online stationery card service 100 stores preferences for each type of product (stationery, greeting card, photo story) so the defaults may be what the user previously chose for this type of product.

Create a Memory and Share from any Device:

One embodiment of the relationship service 1500 and/or memories service 2200 operates in the same manner as the RSVP embodiments described above, allowing the user to create a memory anywhere and at any time. For example, as described above with respect to the RSVP service, a relationship/memories application designed by the online stationery/card service 100 may be installed on certain mobile clients 1590. The relationship/memories application in one embodiment maintains a continuous or periodic communication connection with the relationship service 1500 and/or memories service 2200 and may prompt the user periodically to capture photos and/or video using the photo application of the client device 1590. In response, the relationship/memories application may upload the captured photos and/or video to the relationship/memories service which then adds the photos to the relationship data and/or memories data displayed within the relationship web pages 1505 and/or memories web pages 2202, respectively. In addition, some clients may utilize a Web application such as a Web browser or browser applet to connect to the relationship service 1500 and/or memories service 2200 and upload photos and video captured by photo/video applications. Virtually any data processing device may be configured to connect to the relationship service 1500 and/or memories service 2200 including, for example, personal computers, mobile phones, tablet computers, digital cameras, video cameras, and internet-connected televisions. Various other memory capture devices can be used such as an audio/video device which is always on capturing the last few minutes of audio/video of a conversation. The user may then click a button to store the past few minutes as a memory.

One embodiment of the memories service 2200 encourages the user to capture memories in response to certain event triggers such as location, upcoming events, and/or milestones. In response to these event triggers, the memories service 2200 may generate suggestions of memories that the user may want to capture (thereby reminding the user to capture memories that can be cherished). For example, if the user's daughter is almost a year old, the memories service may suggest that the user capture a video of her first steps and/or a video or audio recording of her giggle (since it will change dramatically over the next few months). As another example, if the user's best friend is having a birthday in a few weeks, the memories service might suggest that the user capture some photos that could be fun to use in the friend's birthday card. As yet another example, if the user is on vacation at a popular destination (e.g., determined from location data 2205 provided from the user's mobile device 151), the memories service may suggest that the user capture photos at a popular spot where other friends have captured photos. It should be noted that these are merely examples of how the memories service may suggest that the user capture memories; the underlying principles of the invention are not limited to these specific details.

Stream Life Stories as they Happen:

As mentioned above, using a relationship/memories application or a web-based relationship/memories applet which automatically connects to the relationship service 1500 and/or memories service 2200, users may share memories immediately, as they are captured. For example, the user may be at a high school reunion continually uploading photos, video and comments to a relationship web page dedicated to high school friends. The capture device of this embodiment includes the user account information and may also include metadata identifying the people in the photos, the time the photos were taken, and the location at which the photos were taken. The user may also enter a description to tell what the story is about and then share the story on the online stationery/card service 100 and/or the external social networking service 1750 (which then distributes the story/photos to the user's friends).

Send Thoughtful Wishes:

In one embodiment, the relationship service 1500 allows users to send a message to a friend to share a thought about them or say thanks. Each message will be stored in digital form and linked to the relationship page 1505 between the user and the friend. As mentioned, the user may then choose to create a paper card or other physical item with the message and send to the user's or friend's mailing address or send electronically.

Order a Printed Copy with One-Click:

As mentioned above, each photo, photo story and card is stored in digital format on the online stationery/card service 100, and friends can create a printed copy to display or place in an album. In one embodiment, when a user wants to create a physical copy of a card or photo story, they can simply click a button to order a printed copy that is mailed to their address, available for pickup in a local retail store, or printed on their home printer. Since the user's mailing address and payment information are stored in the service 100, the click of the button or link causes the order to be placed and the user is charged. A physical copy can also be ordered for delivery to friends with one-click. For each story, the list of friends associated with the story is known by the memories service. A link is provided next to the story to send a copy to all friends associated with the story. For example, a story with photos from college graduation could be sent in a postcard to all the user's inner circle friends that also graduated from the same college.

Relationship Streams:

A relationship stream includes all the memories and greetings shared between two or more people. As mentioned above, the relationship stream may be archived within the online stationery/card service database and displayed within relationship web pages 1505. In one embodiment, a separate relationship stream is maintained between the user and each friend, and between the user and each group of friends defined by the user (or by another user). In one embodiment, a relationship stream shows only the content shared between ALL of the friends association with the relationship.

Related Stories from Friends:

In one embodiment, the metadata for each memory stored on the online stationery/card service 100 is used to link memories together based on relevance. Using the metadata, a user's photo stories are available for linking with all his inner circle friends' photo stories. For example, a memory of a child's first steps may include an automatically generated link to the child's first words, the first steps of the user's other children, and the first steps of the user's friend's children.

Post Links to Cards and Photo Stories on Other Social Networks:

As mentioned above, in one embodiment, when the user creates a card or photo story, the social networking interface 1701 automatically posts a digital version on the external social network 1750. In one embodiment, a link is posted on the recipient's wall of the external social network at the date and time specified by the user posting the card or photo story. The link points to the relationship page 1505 on the online stationery/card website where the digital version of the memory is located. Visitors can then view images of the memory by clicking on the link. The relationship web page may also contain a list of cards that other friends have sent to the user sorted in reverse chronological order. As described in the related applications, the visitor may click a link or button to send a card to the user. Additionally, the web page may include a list of upcoming birthdays based on the visitor's friend list and the visitor can click on a friend in the list to send a card.

Follow Friends to Get Notifications:

In one embodiment, users can "follow" friends by registering to receive instant notifications when a friend shares content on the online stationery/card service. This can make the friend feel like they are experiencing the moment with you since they are viewing it in real-time or near real-time. For example, a user can start capturing a video of their children playing and the friends that are following the user get an email or push notification on their mobile phone. The friend can link to the service and view the video as it is being streamed as if the friend was there with the user.

Stories are Automatically Created Using Metadata:

One embodiment of the memories service and/or relationship service includes an algorithm that creates stories from the memories in the user's and/or friend's memories databases. The algorithm uses all the metadata to associate memories across time based on the people in the memories, the places they were captured, or the theme of the memory. A database also links tags together based on semantic meaning such as "car", "airplane" and "train" associated through "transportation". Once the memories generator 2201 generates a story, it may be displayed within the memories web pages 2202.

In one embodiment, the memories generator 2201 may automatically generate stories based on any user selected memory and responsively generate memories web pages 2202 containing the story. For example, the user may click a button or other action associated with any memory. In response, the memories generator 2201 may generate a story created from other memories associated with this memory based on the metadata 2220. For example, a photo of the user's daughter swinging at the park may link to several more pictures and videos of the user's daughter swinging or playing at the park.

Suggested Memories for Creating a Personalized Product:

One embodiment of the memories service 2200 includes a "smart memories tray" with suggested memories from the user's or friend's memories database when the user creates a personalized product such as a card, photo story print or a gift item. This embodiment may use similar algorithms as the automatically generated stories and web pages (described above) but the suggested memories are based on the occasion and/or recipient of the item being created. For e RSVP service based on the occasion of the event (birthday party, anniversary party, baby shower, etc.), the stationery design chosen for the event, the personal information and design preferences of the ho a holiday card to send to friends and family, the photo tray suggestions may include the best photos of the user's family from the past year. If the user is creating a birthday card for a friend that loves traveling, the photo tray suggestions include photos from a recent trip.

Automatically Create Greeting Cards and Holiday Cards:

In one embodiment, the memories service and/or relationship service automatically creates cards and other items using memories from the memories/friends database. For example, a card or photo book could be created each month using selected photos from the previous month. In one embodiment, the memories service and/or relationship service sends the user an email or other electronic message with a preview of the item and the user can order the item with one-click or edit the item and then order. As another example, the memories service and/or relationship service creates a holiday card using the most popular photos of the user's family from the past year and sends a preview to the user.

Push Service to Cherish and Relive Memories:

One embodiment of the relationship service 1500 and/or memories service 2210 includes a push service which automatically pushes digital notifications (via email or push notifications on a PC application, mobile phone, digital photo frame, tablet computer, television) to users based on a recommendation algorithm. The push service allows the user to cherish and relive archived memories every day instead of having them stored away in a shoebox and never viewed. The algorithm uses the current date and relates the date to all the metadata available for the memories stored in the service. For example, if the user visited a theme park on this day two years ago, the memory from the day at the park are pushed to the user. If today is your anniversary, the push notification might include memories from each anniversary with your spouse for the past ten years. The user can link to the service to view more related memories.

Photo Tagging and Categorization:

As mentioned above, the metadata associated with memories is used to link and search for those memories. One embodiment of the online stationery/card service 100 pushes memories to the user with actions to tag or categorize the memory. For example, the user actions may include "like" and "dislike" (e.g., using a standard thumbs up/down designation); confirm the people in the photo; select the location the photo was captured; and simple tags like "funny" or "cute" or "playing." The user may also enter tags and click a button to add the tags to the memory. This metadata may then be used in the various ways described herein and in the related applications (e.g., to organize and link related photos).

Predictive Auto-Fill Tag Suggestions:

In one embodiment, when the user starts entering characters for a tag, the client software polls the stationery/card service 100 to get a list of suggested tags that an algorithm determines the user might be entering based on the available metadata. The metadata may include, for example, the people in the memory, the place it was captured, when it was captured, other tags associated with this memory, and tags that are used most often in the user's memories database 2210. This saves the user time when entering tags on a device with limited input capabilities such as a mobile phone, camera, tablet, digital picture frame, or television remote control. For example, if a user enters "va" for a memory that was captured in early February and that has her husband in it, the first suggestion might be "valentine." If the user enters "va" on a memory that was captured in the summer months, the first suggestion might be "vacation."

Sample Printed on-Demand with Custom Colors:

In one embodiment, when the user wants to send multiple copies of a card or photo story to friends, the online stationery/card service 100 allows them to order a sample first to confirm they like the product and printing quality. The samples can be ordered for any product in any color and they are printed on demand, thereby removing the need for inventory management. The color may be chosen from a list of options or a custom color entered by the user or captured from the users photos used on the item (as described in the Photo Story Application). In one embodiment, this is accomplished by storing the design template files for every product. When an order is placed, the system software or a person opens the design template file and changes colors of design elements to the color chosen by the user. This also allows users to purchase a personalized product sample with their photos and text placed in the sample item.

Storage and Archival of Content and Files:

All the files associated with memories uploaded to the service are stored and archived in cloud storage data centers. Unlike some photo websites, one embodiment of the online stationery/card service 100 stores full resolution photos and videos.

Remote Control of Memories Viewing:

In one embodiment, the online stationery/card service 100 allows a user to remotely control the viewing of memories by a friend or other user (e.g., while talking to that user on the phone or during a video phone call). For example, while talking to his brother a user could decide to show him a video from a birthday party. In operation, the user would ask his brother to open the memories service application on his computer, phone, tablet, or television and then request remote application control. The user would then attempt to remotely control his brother's application and, after his brother confirms the request, the user may play back the video on his brother's device. In one embodiment, under the control of the user, the content request is sent from the brother's device so the content is accessed from the closest location to him. It may also be retrieved from the cache on the brother's device, from a network caching service closest to him, from the online stationery/card service servers, or from the user's computer (peer to peer).

This embodiment provides a significant benefit in that a user who is computer savvy may control the playback of videos, photos and other content for a user who is less tech-savvy. For example, a user may play back content in this manner for a grandparent who would otherwise be incapable of viewing the content.

Synchronization with External Social Networking Service 1750:

One embodiment of the invention automatically synchronizes certain memories with the external social networking service (e.g., downloading memories added to the external service and/or uploading memories added to the memories service 2200). For example, for memories data that are stored on external services, one embodiment of the memories service will monitor the user's account on those services and when new memory data are available it will retrieve a URL reference to the memory data files on the external service and retrieve and store the metadata. If the user uploads new memories such as photos to the external service, the memories service will analyze the metadata according to the automatic story generation algorithms described herein and in the Photo Story Application. When new stories are created with the new memory data, the service may automatically create a personalized product (e.g., a new card) and send an email to the user with a preview image. The user may then purchase the personalized product with one click and/or edit the item before ordering. For example, the user might upload a new picture of his son playing at the beach to the external Picasa service. The memories service may identify 5 other recent pictures of the user's son playing at the beach, create a photo story page, and send the preview to the user. As another example, the user may upload 10 new pictures from his daughter's birthday party to Facebook. The memories service may then retrieve these new memories and, because it is the daughter's birthday, the memories service may create a photo book with all the photos of the daughter from the previous year and send a preview to the user in an email. As previously discussed, the interface to the social networking service may be accomplished via the public API exposed by the social networking service (and with the end user's name and password).

Online System and Method for Automated Greeting Card Generation and Mailing

Figure 23:
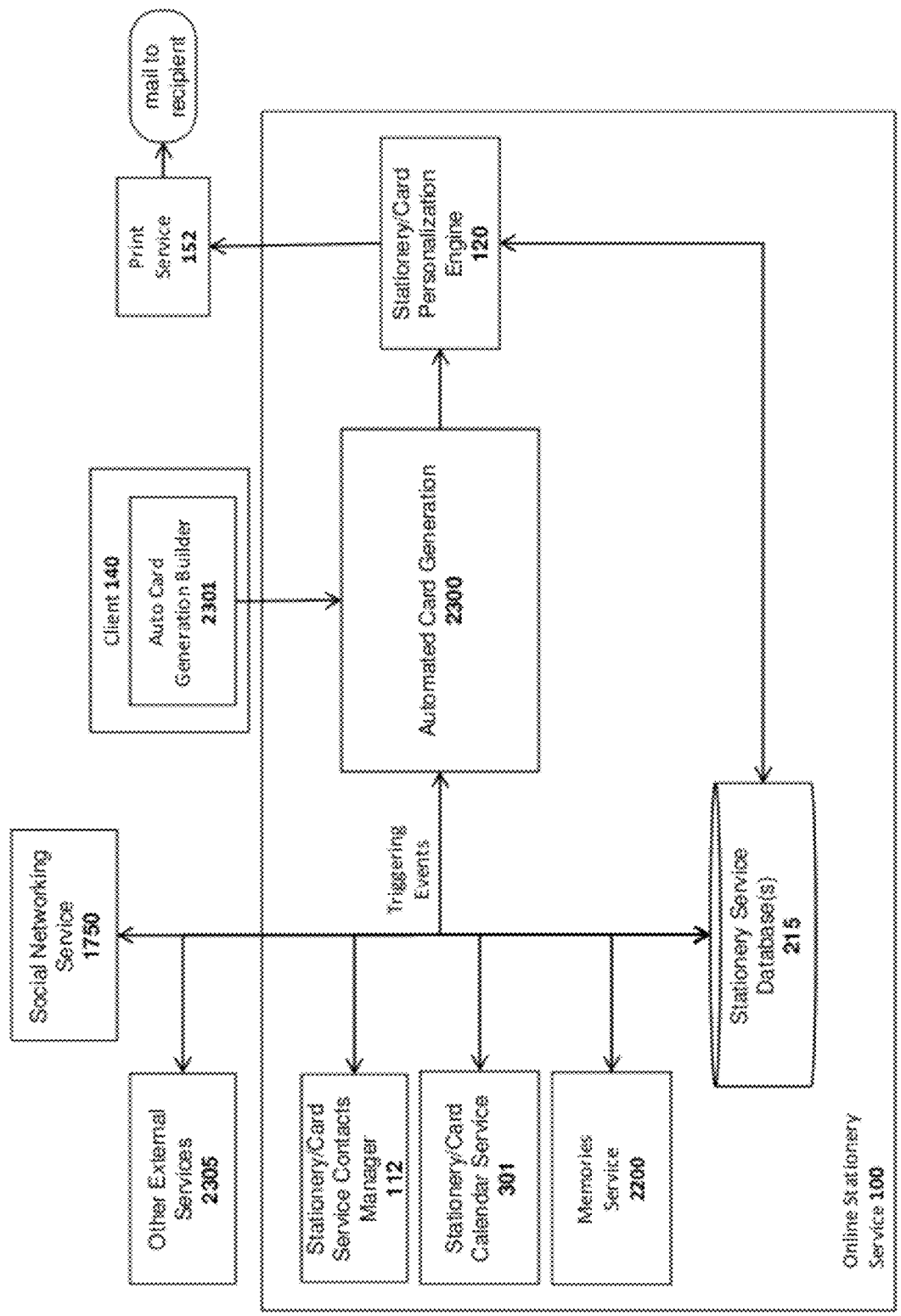
FIG. 23 illustrates one embodiment of a system for automatically mailing greeting cards in response to specified event triggers.

FIG. 23 illustrates one embodiment of an online greeting card system which includes an automated card generation service 2300 for automatically generating and causing cards to be mailed in response to certain specified triggering events. As illustrated, the automated card generation service 2300 may be programmed by an automated card generation builder 2301 executed on the user's client computer 140. In one embodiment, the auto card generation builder 2301 collects a listing of triggering events for which cards should automatically be mailed and stores an indication of those triggering events within the stationery/card service database 215. In addition, in one embodiment, the auto card generation builder 2301 collects the user's preferences for greeting cards (e.g., particular greeting card templates or styles) for different individuals or groups of individuals (e.g., new business acquaintances, new social networking friends, etc). As illustrated, triggering events may come from internal services such as the stationery/card contacts manager 112, calendar service 301, and/or memories service 2200, and external services such as an external social networking service 1750 and/or other external services 2305. In response to these triggering events, the automated card generation service 2300 causes the stationery/card personalization engine to automatically generate new greeting card orders (based on the user's preferences), which are then printed by a print service 152 and automatically mailed on behalf of the end user.

Figure 24:
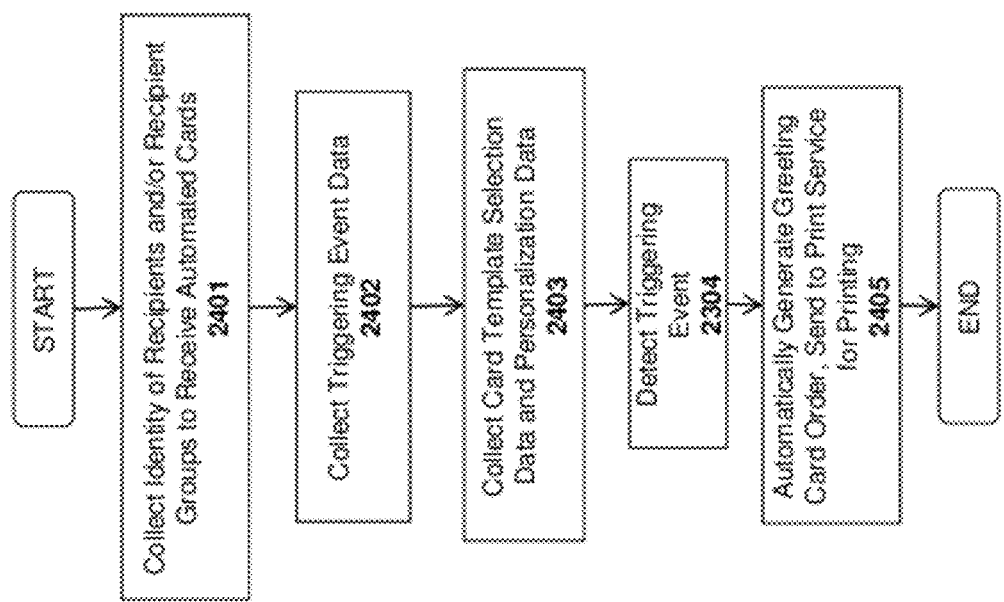
FIG. 24 illustrates a system for automatically generating and mailing greeting cards on behalf of an end user.

A computer implemented method in accordance with one embodiment of the invention is illustrated in FIG. 24. The method may be implemented on the system shown in FIG. 23 but is not limited to any particular system architecture. At 2401, the recipients and/or groups of recipients to whom the user wishes to automatically send greeting cards are identified. Groups may be specified by the end user and may include, for example, groups of family members, friends, and/or work acquaintances (e.g., new customers, co-workers, etc). Any logical grouping of recipients may be set up by the end user.

At 2402, the user-specified triggering events are collected for each of the specified recipients and/or groups. For example, the user may specify a group of customers or co-workers who should receive automated holiday cards each year. Similarly, the user may specify that new customers entered in the user's contacts database should always receive an automated welcome card. As another example, the user may specify that certain family members and friends are to receive automated birthday cards each year. The user may also specify that a birthday card is automatically created with the friend's name and most recent photos and emailed to the user to allow the user to further personalize the card with additional text and photos. Various additional triggering events may be specified while still complying with the underlying principles of the invention. In one embodiment, any triggering events based on dates (e.g., particular birthdays or holidays) are stored by the stationery/card calendar service 301.

At 2403, the user's card template selections are collected. In one embodiment, the card template selection includes an association with each recipient, group of recipients, and/or triggering event. For example, the user may select one template or group of templates for co-workers and another template or group of templates for customers. Similarly, the user may specify a different birthday card template and/or personal message to be used for friends, co-workers, family members, men, women, siblings, etc. The user may specify a group of card selection templates to be used for each category (e.g., birthdays of co-workers) and allow the automated card generation service 2300 to rotate through all of the template selections for all of the above categories (e.g., so that two co-workers, friends or family members do not receive the same greeting card). Other options for card templates include the recommended design based on the interests of the recipient retrieved from external social networking services. In addition, at 2403, the user may specify personalization data such as personalized messages for each of the recipients, groups of recipients, and/or triggering events.

At 2304, a triggering event is detected by the automated card generation service 2300. For example, the user may have entered a new customer in an external customer database (represented by external services 2305) or in the local stationery/card service contacts manager 112. As another example, a particular recipient's birthday may be a week away (as indicated by the stationery/card calendar service 301). In response, at 2405, the automated card generation service 2300 causes the stationery/card personalization engine 120 to automatically generate a new greeting card order using the template associated with the triggering event and/or a personalized message specified for the event by the end user. The greeting card order is then printed and mailed on behalf of the end user.

Several specific examples of system operation will now be provided for the purposes of illustration. It should be noted, however, that the underlying principles of the invention are not limited to these specific examples.

Welcome New Customers.

In one embodiment, a business may program the automated card generation logic 2300 to automatically generate and send a thank you or welcome card to each new customer. The business may specify a personalized message and card template ahead of time. In one embodiment, if the name of the contact at the new customer and the customer address may be retrieved from the contacts manager 112 (or from the external contacts service 2305). The welcome greeting card may include a special offer based on the type of product purchased.

Thank You Cards.

In one embodiment, a business may program the automated card generation logic 2300 to send a thank you card after each visit or purchase. In this embodiment, the business' website (represented by external service 2305) may communicate with the automated card generation service 2300 over the Internet. For example, a dental office might send a thank you card after each checkup with a note from the doctor summarizing the checkup and reminders of what the patient should do to keep his/her teeth healthy. As previously described, these templates may be designed by the dentist's office ahead of time and stored on the online card service 100. Similarly, a wedding planner might send a thank you card after the wedding with a photo of the new couple. A car dealer might send a thank you card after a new car purchase that includes the customer name, model of car purchased and a note from the salesperson.

New Product Announcements.

In one embodiment, a business may program the automated card generation logic 2300 to send an announcement card to each customer when new products are available. For example, an art gallery might send a post card to each customer each time new works are added to the gallery.

Birthday Cards for Customers.

In one embodiment, a business may program the automated card generation logic 2300 to send a thank you card to customers on their birthday that includes the customer name and uses a card design based on the customer's gender and/or the type of customer.

New Contacts Cards.

In one embodiment, when a person meets a new contact for a business relationship, the automated card generation service 2300 may automatically send a card with a personal note of gratitude. The card may be created when a new contact is added to the user's address book and prefilled with the new contact's name. As previously described, a template for this event may be set up by the user ahead of time.

Photo Cards and Books.

As described in the photo story and related applications, one embodiment of the automated card generation service 2300 can be set up to automatically send a card or book each time new photos are captured or uploaded to the online card service 100. The user can set multiple recipients so that each time new photos are taken, prints are automatically made and sent to a designated set of recipients.

One embodiment of the automated card generation service will include the following additional features:

Address Book Integration.

One embodiment of the automated card generation service 2300 detects when the user adds a contact to Outlook or their mobile phone and this event triggers sending a card to the new contact. The internal contacts manager 112 and/or an external contacts manager (represented by external services 2305) may be used.

Integration with Social Networks.

As described in the co-pending application entitled SOCIAL NETWORKING SYSTEM AND METHOD FOR AN ONLINE STATIONERY OR GREETING CARD SERVICE (referenced above), one embodiment of the online card service 100 is integrated with other online social networking services such as LinkedIn or Facebook. As such, in one embodiment, the automated card generation service 2300 detects when the user makes a new "friend" on one of these services and automatically sends a new greeting card to the new friend. The user may first be prompted to enter an address for the friend if one is not available from the service.

Integration with Customer Relationship Management (CRM) Systems.

In one embodiment, the automated card generation service 2300 provides application programming interfaces (APIs) to integrate with external systems 2305 where customer data is stored in order to provide access to the customer information needed for sending a greeting card.

Personalization Template.

The user can set up a template for the message that is printed in each card with text variables for customer name, contact name, order information, salesperson or customer service person name, special offer, and note.

Integration with Popular Online Photo Services.

The service will detect when the user uploads new photos and send cards, prints or books to recipients.

In one embodiment, the following trigger events and conditions are supported to automatically send cards or photo books to a recipient. In one embodiment, any of the conditions specified below may be evaluated when selecting an appropriate card template.

New Customer.

The triggering event is that a new customer was added to the customer database. The conditions include customer type, gender, age, city, state, zip code, country.

New Orders.

The triggering event is that a new order was completed. The conditions include total price, product name or ID, quantity, total number of purchases, number of purchases since last card (send a card every 10 purchases).

New Appointment or Event.

The triggering event is that a calendar appointment or event is completed. The calendar may be an internal calendar 301 or an external calendar (represented by external services 2305). Conditions include type of event, type of customer, gender.

New Products.

The triggering event is that a new product was added to the product database. Conditions include product type, customer type, and gender. In one embodiment, any of these conditions may be evaluated when selecting an appropriate card template.

Birthday.

A birthday event occurs. Conditions include customer type, gender, date of last purchase, total purchase amount in last year. This information may be maintained in the user's electronic calendar.

New Contact.

A new contact was added to the contacts database or address book (which, as mentioned above may be internal 112 or external 2305). Conditions include contact type (business, personal, family), gender.

New Photos.

A new photo was added to the online photo database. A new card may be generated as part of the process of automatically generating a photo story, as described in the Photo Story application, referenced above and incorporated herein by reference. Conditions include album type, location, people, and tags.

In one embodiment, the clients described above (e.g., client 140, client 451, client 151, client 1590) are users connecting to the service 100 via an Internet connection. It should be noted, however, that this particular networking arrangement and client location is not required for complying with the underlying principles of the invention. For example, in one embodiment, the clients described above are computing devices located at a retail outlet of a photo/card/stationery service and the online service is located at the retail outlet, over the Internet, or over a private wide area network (WAN). In this embodiment, the retail outlet may include printing and/or photo developing equipment to print physical copies of the user's memories and memory compilations (e.g., photo stories, greeting cards, etc) created on the service. If the service is accessible over the Internet and accessible at a retail location, then the user may initially connect to the service over the Internet to work on a compilation of a group of memories and may use the retail outlet to complete and print the compilation. Various alternative configurations may be employed while still complying with the underlying principles of the invention.

In one embodiment, the Web server used to implement the embodiments of the invention described herein is an Apache web server running on Linux with software programmed in PHP using a MySQL database. In addition, the platform may employ various techniques for establishing communication with clients and other services. For example, one embodiment of the online stationery service 100 exposes an application programming interface (API) to enable communication with clients and other services. The API may be based on a Representational State Transfer (REST) architecture for distributed hypermedia systems. However, the underlying principles of the invention are not limited to any particular type of protocol or platform.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules such as wizards and other logic may be implemented as software, hardware or any combination thereof. Accordingly, the scope and spirit of the invention should be judged in terms of the claims which follow.

What is claimed:

1. A method for automatically generating and sending a greeting card comprising:
   collecting from a user of an online card service an identity of recipients or recipient groups to receive automated card mailings;
   collecting triggering event data specifying one or more triggering events upon detection of which, a greeting card is to be automatically generated and mailed to the recipients or recipient groups;
   collecting card template and personalization data specifying card templates to be associated with the recipients or recipient groups, the one or more triggering events, and personalized messages to be used for each of the various recipients, recipient groups or triggering events;
   automatically detecting a triggering event by a computer system without user intervention, wherein the triggering event comprises one or more of the following:
   addition of the recipient to the user's address book,
   one or more recipients visiting the user's website,
   a purchase of a product or service from the user,
   a new product announced by the user as a business owner,
   a new photo or group of photos being uploaded to an online photo service, or the user becoming friends on a social networking site with one or more of the recipients;
   in response to detection of the triggering event, automatically combining the card template with the personalized message to create a greeting card without user intervention;
   generating a web page at the online card service to maintain ongoing history of relationship between the user and the recipients or group of recipients wherein the web page includes the greeting card; and
   sending a greeting card order to a print service, wherein the print service prints and mails the greeting card to the recipients or group of recipients on behalf of the user.

2. The method as in claim 1, wherein the user is a business and the recipient is a new customer added to the business' address book.

3. The method as in claim 1, wherein the greeting card is generated using one or more of the photos.

4. The method as in claim 1 wherein one of the recipients comprises customers.

5. The method as in claim 1 wherein one of the recipients comprises co-workers.

6. The method as in claim 1 wherein one of the recipients comprises friends.

7. The method as in claim 1 further comprising:
   prior to sending a print order to the print service, automatically generating an electronic copy of the greeting card order with a friend's name and most recent photos associated with the friend; and
   emailing the electronic copy of the greeting card order to the user to allow the user to further personalize the card with additional text and photos.

8. The method as in claim 7 wherein the triggering event is the friend's birthday and the greeting card order uses a birthday card template.

9. The method as in claim 1 wherein the user specifies a group of card templates to be used for specified groups of recipients, the method further comprising:
   rotating through the card template when selecting cards for different ones of the specified group of recipients such that recipients in the specified group receive cards having different card templates.

10. The method as in claim 9 further comprising:
    retrieving metadata about one or more of the group of recipients; and
    selecting a card template for at least one of the recipients based on the metadata associated with the recipient.

11. The method as in claim 10 wherein the metadata is retrieved from an external social networking service on which the recipient is a member.

12. The method as in claim 10 wherein the metadata comprises one or more interests of the recipient.

* * * * *